United States Patent
Ye et al.

(10) Patent No.: US 11,966,264 B2
(45) Date of Patent: Apr. 23, 2024

(54) SYSTEM OF PROVIDING POWER TO CHIP ON MAINBOARD

(71) Applicant: Delta Electronics (Shanghai) CO., LTD, Shanghai (CN)

(72) Inventors: Haoyi Ye, Shanghai (CN); Jianhong Zeng, Shanghai (CN); Xiaoni Xin, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 18/320,232

(22) Filed: May 19, 2023

(65) Prior Publication Data
US 2023/0288969 A1  Sep. 14, 2023

Related U.S. Application Data

(63) Continuation of application No. 17/076,812, filed on Oct. 22, 2020, now Pat. No. 11,693,459, which is a continuation of application No. 16/251,554, filed on Jan. 18, 2019, now Pat. No. 10,845,853.

(30) Foreign Application Priority Data

Feb. 1, 2018 (CN) .......................... 201810103774.5

(51) Int. Cl.
*G06F 1/26* (2006.01)
*G06F 1/18* (2006.01)
(Continued)

(52) U.S. Cl.
CPC .............. *G06F 1/189* (2013.01); *H02M 3/02* (2013.01); *H02M 3/1584* (2013.01)

(58) Field of Classification Search
CPC ............ G06F 1/18; H02M 3/02; H02M 3/158
See application file for complete search history.

(56) References Cited

U.S. PATENT DOCUMENTS 8,473,762 B2 * 6/2013 Dennard ............. H01L 25/0657
257/691
2006/0174145 A1 * 8/2006 Chapuis ............ H02J 13/00016
713/300
(Continued)

FOREIGN PATENT DOCUMENTS

CN         101056049 A      10/2007
CN         105207183 A      12/2015
(Continued)

OTHER PUBLICATIONS

1st Office Action dated Feb. 6, 2024 of Chinese Application No. 202010678690.1.

*Primary Examiner* — Jared Fureman
*Assistant Examiner* — Esayas G Yeshaw
(74) *Attorney, Agent, or Firm* — Qinghong Xu

(57) ABSTRACT

A system of providing power to a chip on a mainboard includes: a first power supply, located on the mainboard, and being configured to receive a first voltage and to provide a second voltage; and a second power supply and a third power supply, located on the mainboard and disposed at different sides of the chip, each of the second power supply and the third power supply is electrically connected to the first power supply to receive the second voltage, the second power supply provides a third voltage to the chip, the third power supply provides a fourth voltage to the chip, and $Z_{BUS\_2} \leq 5*(Z_{PS2\_2}+Z_{PDN\_2})$, $Z_{BUS\_2}$ is bus impedance between the first power supply and the third power supply, $Z_{PS2\_2}$ is equivalent output impedance of the third power supply, and $Z_{PDN\_2}$ is transmission impedance between the third power supply and the chip.

27 Claims, 28 Drawing Sheets

(51) Int. Cl.
*H02M 3/02* (2006.01)
*H02M 3/158* (2006.01)

(56) References Cited

U.S. PATENT DOCUMENTS

| | | |
|---|---|---|
| 2010/0106338 A1 | 4/2010 | Nam et al. |
| 2010/0259299 A1* | 10/2010 | Dennard ............... H03K 3/00 326/80 |
| 2011/0298440 A1* | 12/2011 | Chang .................. H02M 3/07 323/299 |
| 2017/0302157 A1 | 10/2017 | Lin et al. |
| 2018/0342572 A1 | 11/2018 | Park et al. |
| 2019/0235590 A1 | 8/2019 | Ye et al. |
| 2022/0179437 A1* | 6/2022 | Lee ....................... H02M 3/04 |

FOREIGN PATENT DOCUMENTS

| | | |
|---|---|---|
| CN | 105449987 A | 3/2016 |
| CN | 105653765 A | 6/2016 |
| CN | 106329930 A | 1/2017 |
| CN | 106571732 A | 4/2017 |
| CN | 109720404 A | 5/2019 |
| CN | 109873560 A | 6/2019 |
| CN | 110112905 A | 8/2019 |
| CN | 209358286 U | 9/2019 |
| CN | 209981206 U | 1/2020 |
| CN | 111007917 A | 4/2020 |
| DE | 102018218375 A1 | 5/2019 |
| JP | H1189027 A | 3/1999 |
| JP | H11289691 A | 10/1999 |
| JP | 2017228683 A | 12/2017 |
| WO | 2020012796 A1 | 1/2020 |

\* cited by examiner (a) Circuit diagram  (b) Waveform diagram (a) Top view (b) Side view (a) Circuit diagram  (b) Waveform diagram (a) Circuit diagram  (b) Waveform diagram (a) Top view (b) Side view (a) Top view (b) Side view (a) Top view (b) Side view (a) Top view (b) Side view

SYSTEM OF PROVIDING POWER TO CHIP ON MAINBOARD

CROSS-REFERENCE TO RELATED APPLICATIONS

This application is a CA of U.S. application Ser. No. 17/076,812, filed on Oct. 22, 2020, which is a CA of U.S. application Ser. No. 16/251,554, which is based on and claims priority to Chinese patent application No. 201810103774.5 filed on Feb. 1, 2018, the entire content of which is hereby incorporated by reference for all purposes.

TECHNICAL FIELD

The disclosure relates to the technical field of power supplies on mainboards, particularly to a system of providing power to a chip on a mainboard.

BACKGROUND

With the improvement of requirements for smart living of people, the demand for data processing in society is growing. The core of data processing lies in various types of intelligent processor chips, such as central processing units (CPUs), graphics processing units (GPUs), field programmable gate arrays (FPGAs) and application specific integrated circuits (ASICs). The processing speed of the processor chip for data, that is, the performance, is one of the key factors to achieve a certain degree of intelligence. Because the processor chip is very expensive, both the processor chip provider and the user have done a lot of optimization work on how to fully exert the performance of the processor chip. The exertion of the performance of the processor chip must be based on a stable supply voltage, so the steady-state performance and dynamic performance of the power supply to the processor chip are key factors. At present, the global energy consumption in data processing reaches hundreds of billions or even trillions of kilowatt-hours per year, and it continues to rise as the demand of data processing increases. Therefore, the performance per watt becomes an important index for measuring a processor chip, a server system and even the entire data center.

In order to reduce transmission loss, the power supply structure of a data center is constantly evolving. It is a trend to adopt a bus voltage of 48V or higher, such as a high DC (Direct current) bus voltage of 400V, to continuously improve power consumption of a data center. The increase of the bus voltage may increase the input of a point-of-load (POL) power supply from 12V to 48V or even to 400V. The increase of input voltage greatly increases the voltage difference between the input and output of a power supply on a mainboard, which poses a new challenge to the power supply of the processor chip in a server.

The two-stage structure is an effective solution to solve the huge difference between the input and output voltage of a power supply on a mainboard. FIG. 1 is a schematic diagram of a circuit of a system of providing power to a chip on a mainboard in prior art. As shown in FIG. 1, the input voltage of the preceding-stage power supply 2 is 12V, 48V or 400V, the preceding-stage power supply 2 converts the input power into a certain voltage and outputs it to the post-stage power supply 3, and the post-stage power supply 3 finally outputs a DC voltage that is ≤2V to be used by the chip 1, wherein the chip 1 is, for example, a processor chip.

As the semiconductor process is improved continuously, the supply voltage of the processor chip drops continuously. For example, the supply voltage of a chip using a 14 nm process is around 0.8V, while the voltage of an integrated circuit (IC) of a 10 nm process will drop to 0.6V. However, due to the increase of the number of transistors in a single processor chip and the increase of the operating frequency of the transistors, the power required by the chip is not reduced, so the power supply current to the chip may increase. The continuous reduction of voltage and the continuous increase of current put forward higher requirements for the performance of the power supply on a mainboard.

FIG. 2 is a schematic diagram of a circuit of another system of providing power to a chip on a mainboard in prior art. As shown in FIG. 2, the input voltage of the preceding-stage power supply 2 is 12V, 48V or 400V. The preceding-stage power supply 2 converts the input power into a voltage that is ≤6V and outputs it to the post-stage power supply 3', and the post-stage power supply 3' finally outputs a DC voltage that is ≤2V to be used by the chip 1. Using a low bus voltage, for example, less than 6V between the two power stages, that is, the preceding-stage power supply 2 and the post-stage power supply 3', is more advantageous for use of high frequency switching elements in the post-stage power supply 3', so as to improve dynamic response performance of the post-stage power supply 3' without sacrificing the efficiency of the power converter.

When considering the dynamic change of the supply voltage for the processor chip along with the current of the processor chip, besides the dynamic response performance of the power module itself, one must consider the transmission impedance $Z_{PDN}$, in the power supply path. FIG. 3 is an equivalent circuit diagram of a system of providing power to a chip on a mainboard in prior art, that is, an equivalent circuit of the system of providing power to a chip on a mainboard in FIG. 1 or FIG. 2. The FIG. 3 is used for explaining the relationship among the dynamic current, the power supply impedance, the transmission impedance and the voltage variation in FIG. 1 or FIG. 2. The power supply, that is, the combination of the preceding-stage power supply 2 and the post-stage power supply 3 (or 3'), is equivalent to an ideal voltage source E in series with an equivalent output impedance $Z_{PS}$, and the chip 1 is equivalent to a current source load R having high frequency transition. When the current flowing through the chip 1 changes by $\Delta i$, the voltage change on the power supply input port of the chip 1 is $\Delta v = \Delta i * (Z_{PS} + Z_{PDN})$. It can be seen that the source impedance $Z_{PS}$ and the transmission impedance $Z_{PDN}$ have a direct impact on the magnitude of the variation of the processor supply voltage.

As the above mentioned, the development trend of the operating voltage of the processor chip will be continuous decline, which means that the proportion of the voltage change $\Delta v$ of the same magnitude in the required operating voltage will be larger and larger, so the voltage variation amplitude $\Delta v$ must be reduced to meet the same voltage accuracy requirement. At the same time, the operating current of the processor chip is still likely to increase, so the potential current change $\Delta i$ is likely to increase, which means that the entire power supply loop, that is, the combination of the preceding-stage power supply 2 and the post-stage power supply 3 (or 3') must ensure a smaller $\Delta v$ at a higher $\Delta i$, therefore, higher requirements are imposed on the power supply impedance and the transmission impedance.

FIG. 4 is an equivalent circuit diagram of another system of providing power to a chip on a mainboard in prior art, that is, another equivalent circuit of the system of providing power to a chip on a mainboard in FIG. 2 or FIG. 3. As shown in FIG. 4, in the two-stage power supply structure shown in FIG. 2 or FIG. 3, the power supply impedance is composed of the following parts: the equivalent output impedance $Z_{PS1}$ of the preceding-stage power supply 2, the impedance $Z_{BUS}$ of the intermediate low-voltage bus line, the equivalent output impedance $Z_{PS2}$ of the post-stage power supply 3 (or 3') and the transmission impedance $Z_{PDN}$ between the post-stage power supply 3 (or 3') and the chip 1. In FIG. 4, the post-stage power supply 3 (or 3') is equivalent to a model in which an ideal transformer having a certain voltage conversion ratio is connected in series with the equivalent output impedance $Z_{PS2}$, where N represents the multiple of the input voltage to the output voltage of the post-stage power supply 3 (or 3').

FIG. 5 is a circuit diagram of a post-stage power supply of a system of providing power to a chip on a mainboard in prior art, and a waveform diagram of corresponding voltages and currents during load transition, for explaining the problems exists in the system of providing power to a chip on a mainboard in FIG. 2 or FIG. 3. As shown in the circuit diagram (a) in FIG. 5, the post-stage power supply 3 (or 3') of the system of providing power to a chip on a mainboard in prior art is, for example, a typical step-down chopper (Buck) circuit composed of a switch K, a diode D, an inductor L and a capacitor C. The waveform diagram (b) in FIG. 5 shows a current $i_{load}$ and a voltage Vo (i.e., the output voltage Vo of the Buck circuit) applied to the chip 1, a current $i_L$ on the inductor L and a duty ratio d of the switch K (i.e., the duty ratio of the Buck circuit) that varies along with time.

When the post-stage power supply 3 (or 3') is a Buck circuit, the multiple N of the foregoing FIG. 4 is equal to the ratio of the input voltage Vin of the Buck circuit to the output voltage Vo of the Buck circuit, i.e., 1/d.

From FIG. 4, it can be obtained that the total impedance from the preceding-stage power supply 2 to the power supply input port of the chip 1

$$Z=(Z_{PS1}+Z_{BUS})/N^2+Z_{PS2}+Z_{PDN} \quad \text{(Formula 1)}.$$

When the post-stage power supply 3 (or 3') is a Buck circuit, $$Z=(Z_{PS1}+Z_{BUS})*d^2+Z_{PS2}+Z_{PDN} \quad \text{(Formula 2)}.$$

When the load of the chip 1 is changed from light load to heavy load, in order to make the current $i_L$ of the output inductor L catch up with the load current $i_{Load}$ as soon as possible, the Buck circuit must increase the duty ratio d to the maximum, thereby reducing the drop of the output voltage Vo of the load side, the course of which can be illustrated by the waveform (b) in FIG. 5. In actual use, the maximum duty ratio of the Buck circuit during load dynamic transition is very close to 1, i.e., d≈1, so, during the transient course due to the dynamic increase of the load, the impedance of the power supply path $$Z≈(Z_{PS1}+Z_{BUS})*1^2+Z_{PS2}+Z_{PDN}=Z_{PS1}+Z_{BUS}+Z_{PS2}+Z_{PDN} \quad \text{(Formula 3)},$$

that is, both the impedance $Z_{PS1}$ of the preceding-stage power supply 2 and the bus impedance $Z_{BUS}$ between the preceding and post-stage power supplies are directly expressed in the impedance of the entire power supply circuit, so, in order to meet the increasing dynamic requirement of the processor chip load, all impedances in the formula 3 should be reduced.

Although the post-stage power supply 3' in the two-stage power supply structure shown in FIG. 2 can employ a high frequency power supply module, to reduce the equivalent output impedance $Z_{PS1}$ of the preceding-stage power supply 2 and the equivalent output impedance $Z_{PS2}$ of the post-stage power supply 3', the bus voltage between the preceding and post-stage power supplies is low, resulting in a large bus current, which puts higher requirements on the bus impedance, therefore, more copper foil is needed for power transmission on the wiring.

In addition, the spatial arrangement of the system of providing power to a chip on a mainboard in prior art is limited by the circuit board wiring. FIG. 6 is a schematic diagram of the spatial arrangement of a system of providing power to a chip on a mainboard in prior art. As shown in the top view (a) and the side view (b) of FIG. 6, thousands of high speed signal lines 4 are distributed around the chip 1. When both the preceding-stage power supply 2 and the post-stage power supply 3 are placed at the same side of the chip 1, since the post-stage power supply 3 supplies all power for the chip 1, the volume size of the post-stage power supply 3 is large. In order to avoid intervening the area of the high speed signal lines 4, the preceding-stage power supply 2 and the post-stage power supply 3 cannot be close to the chip 1, thus, the impedance $Z_{PDN}$ of the transmission path from the preceding-stage power supply 2 and the post-stage power supply 3 to the chip 1 cannot be lowered.

In summary, the power supply structure of the power supply on a mainboard involved in the prior art cannot well meet the development requirements of the future processor chip for dynamic response of the power supply on a mainboard.

SUMMARY

The object of the present disclosure is to provide a system of providing power to a chip on a mainboard, so as to at least partly overcome the above-mentioned technical problems due to limitations and disadvantages of the related art.

Other features and advantages of the present disclosure will become apparent from the following detailed description, or will be partly obtained by practice of the present disclosure.

According to a first aspect of the present disclosure, a system of providing power to a chip on a mainboard is provided, including: a first power supply, located on the mainboard, where the first power supply is configured to receive a first voltage and to provide a second voltage; and a second power supply and a third power supply, where the second power supply and the third power supply are located on the mainboard and disposed at different sides of the chip, each of the second power supply and the third power supply is electrically connected to the first power supply to receive the second voltage, the second power supply provides a third voltage to the chip, the third power supply provides a fourth voltage to the chip, and $Z_{BUS\_2}≤5*(Z_{PS2\_2}+Z_{PDN\_2})$, where $Z_{BUS\_2}$ is bus impedance between the first power supply and the third power supply, $Z_{PS2\_2}$ is equivalent output impedance of the third power supply, and $Z_{PDN\_2}$ is transmission impedance between the third power supply and the chip.

According to a second aspect of the present disclosure, another system of providing power to a chip on a mainboard is provided, including: a first power supply and a second power supply, where the first power supply and the second power supply are located on the mainboard, each of the first power supply and the second power supply is configured to receive a first voltage, the first power supply provides a second voltage, and the second power supply provides a third voltage; a third power supply and a fourth power supply, where the third power supply and the fourth power supply are located on the mainboard, the third power supply is electrically connected to the first power supply to receive the second voltage, the fourth power supply is electrically connected to the second power supply to receive the third voltage, the third power supply and the first power supply are disposed at a first side of the chip, the fourth power supply and the second power supply are disposed at a second side of the chip, the first side of the chip and the second side of the chip are adjacent or opposite sides of the chip, the third power supply provides a fourth voltage to the chip, the fourth power supply provides a fifth voltage to the chip; and at least one power supply controller, located on the mainboard, and configured to control operation of the third power supply and the fourth power supply.

The system of providing power to a chip on a mainboard according to the present disclosure can reduce line impedance of the two-stage power supply architecture, reduce the volumes of post-stage power supplies, even better exert the performance of a plurality of post-stage power supplies, and improve response and frequency characteristics of the power supply, thus increasing efficiency of the power supply.

For a better understanding of the features and technical content of the present disclosure, reference should be made to the detailed specification the accompanying drawings about the present disclosure. However, the detailed specification the accompanying drawings are only used for illustrating the present disclosure, not for any restriction on the scope of the claims of the present disclosure.

BRIEF DESCRIPTION OF THE DRAWINGS

The above and other features and advantages of the present disclosure will become more apparent by describing exemplary embodiments thereof with reference to accompanying drawings.

DETAILED DESCRIPTION

Figure 1:
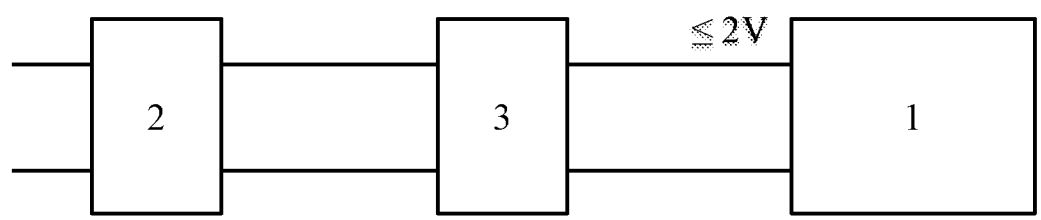
FIG. 1 is a schematic diagram of a circuit of a system of providing power to a chip on a mainboard in prior art.
Figure 2:
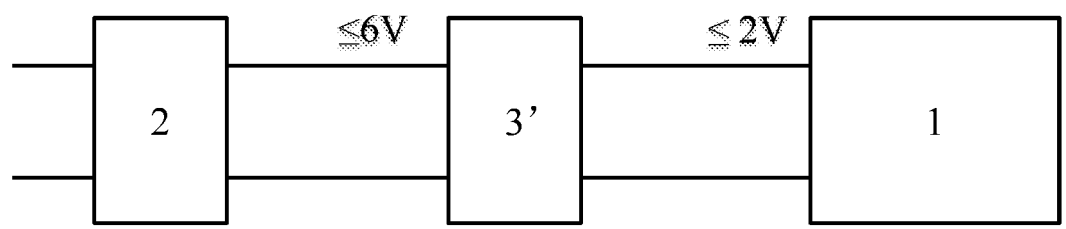
FIG. 2 is a schematic diagram of a circuit of another system of providing power to a chip on a mainboard in prior art.
Figure 3:
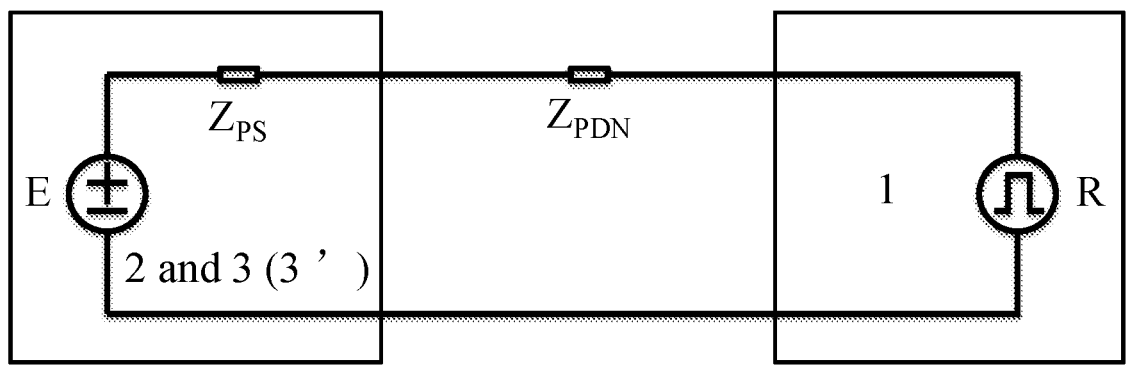
FIG. 3 is an equivalent circuit diagram of a system of providing power to a chip on a mainboard in prior art.
Figure 4:
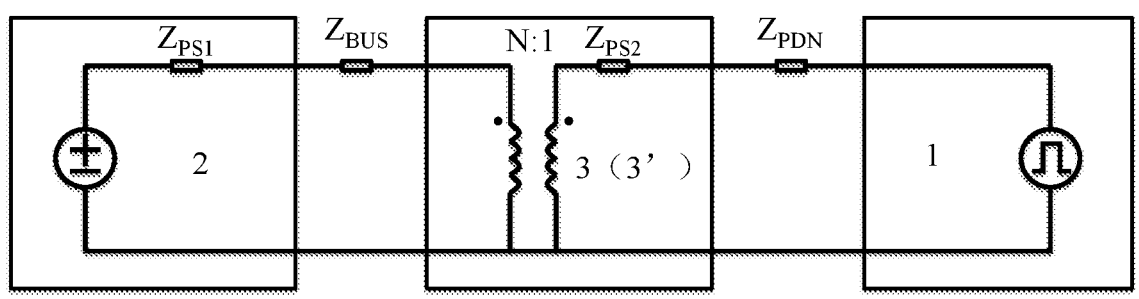
FIG. 4 is an equivalent circuit diagram of another system of providing power to a chip on a mainboard in prior art.
Figure 5:
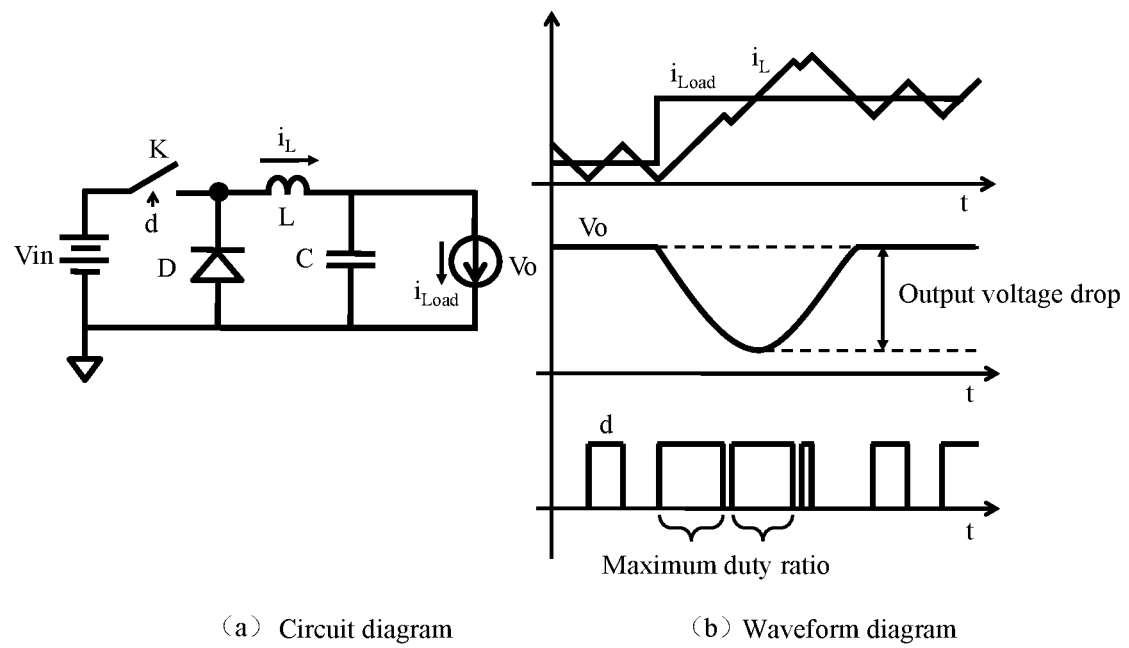
FIG. 5 is a circuit diagram of a post-stage power supply of a system of providing power to a chip on a mainboard in prior art, and a waveform diagram of corresponding voltages and currents during load transition.

Exemplary embodiments will now be described more fully with reference to the accompanying drawings. However, the exemplary embodiments can be embodied in a variety of forms and should not be construed as being limited to the embodiments set forth herein. Rather, these embodiments are provided so that the present disclosure will be thorough and complete and the concepts of the exemplary embodiments are fully conveyed to those skilled in the art. The same reference numerals in the drawings denote the same or similar parts, and the repeated description thereof will be omitted.

Furthermore, the described features, structures or characteristics may be combined in any suitable manner in one or more embodiments. In the following description, numerous specific details are set forth to provide a thorough illustration to the embodiments of the disclosure. However, one skilled in the art will appreciate that the technical solution of the disclosure may be practiced without one or more of the specific details, or may be practiced by employing other structures, components, steps, methods, etc. In other instances, well known structures, components or operations are not shown or described in detail to avoid obscuring the respective aspects of the disclosure.

Figure 7:
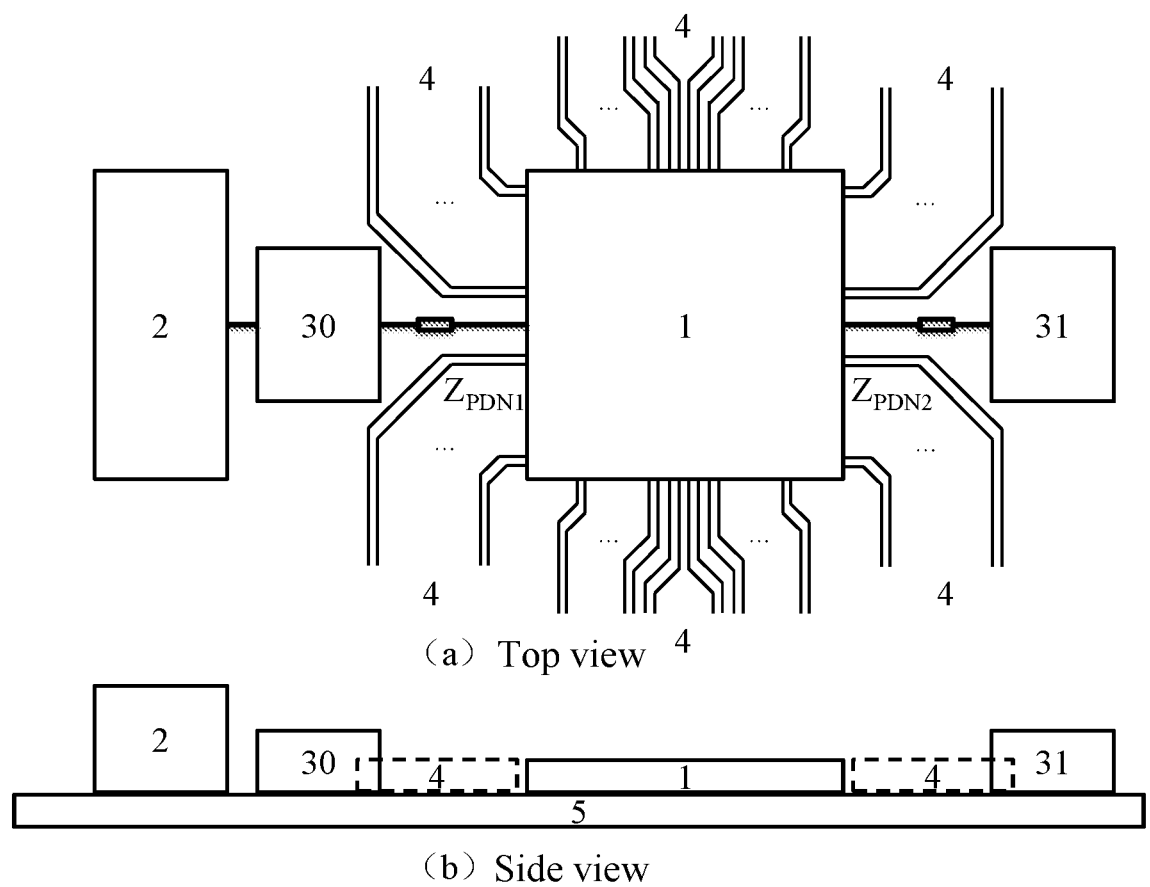
FIG. 7 is a schematic diagram of the spatial arrangement of a system of providing power to a chip on a mainboard according to an embodiment of the present disclosure.

At first, please refer to FIG. 7. FIG. 7 is a schematic diagram of the spatial arrangement of a system of providing power to a chip on a mainboard according to an embodiment of the present disclosure. As shown in the top view (a) and the side view (b) of FIG. 7, the system of providing power to a chip on a mainboard of the present disclosure includes a preceding-stage power supply 2, a first post-stage power supply 30 and a second post-stage power supply 31, for providing power to a chip 1 disposed on a mainboard 5, wherein the chip 1 is, for example, a processor chip.

The preceding-stage power supply 2 is located on the mainboard 5. The preceding-stage power supply 2 is a DC-DC converter, and is configured to receive a first DC voltage (e.g., 400V, 48V, 12V, etc.) and to provide a second DC voltage (e.g., 48V, 12V, 6V, etc.), wherein the first DC voltage is greater than the second DC voltage.

Both the first post-stage power supply 30 and the second post-stage power supply 31 are located on the mainboard 5, and are DC-DC converters, wherein both the first post-stage power supply 30 and the second post-stage power supply 31 can be electrically connected to the preceding-stage power supply 2 through the wiring on the mainboard 5, so as to receive the second DC voltage. The first post-stage power supply 30 is disposed at the first side of the chip 1, and the second post-stage power supply 31 is disposed at the second side of the chip 1. As shown in FIG. 7, the first side and the second side are opposite to each other. The distance on the mainboard 5 between the first post-stage power supply 30 and the chip 1 is less than or equal to the distance between the preceding-stage power supply 2 and the chip 1. The distance on the mainboard 5 between the second post-stage power supply 31 and the chip 1 is less than or equal to the distance between the preceding-stage power supply 2 and the chip 1. The first post-stage power supply 30 provides a third DC voltage (e.g., 2V) to the chip 1, and the second DC voltage is greater than the third DC voltage. The second post-stage power supply 31 provides a fourth DC voltage (for example, 1V) to the chip 1, and the second DC voltage is greater than the fourth DC voltage. That is, the input voltages of the first post-stage power supply 30 and the second post-stage power supply 31 are greater than their output voltages, respectively. The preceding-stage power supply and the two post-stage power supplies can be connected through the wiring on the mainboard 5.

Figure 6:
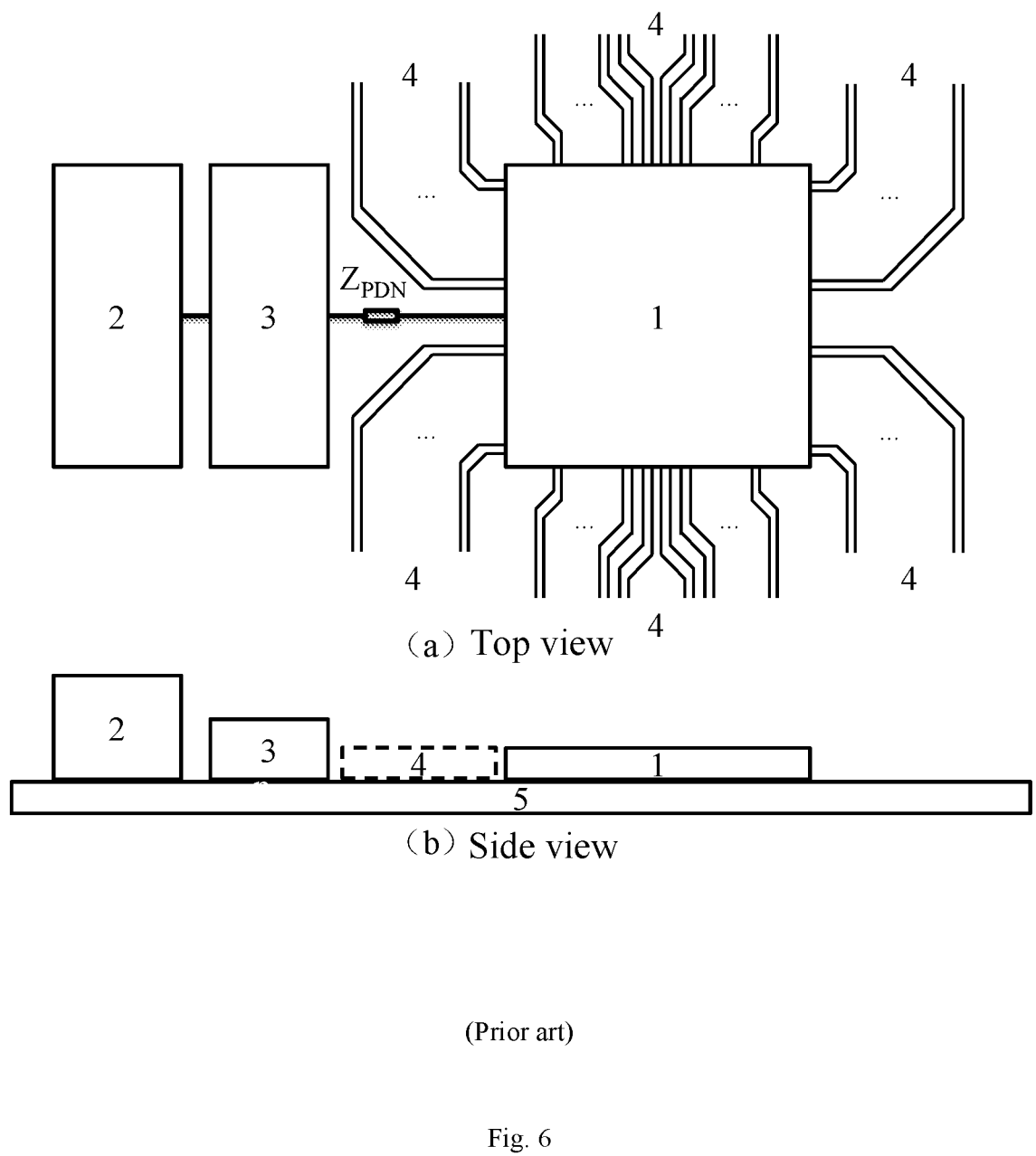
FIG. 6 is a schematic diagram of the spatial arrangement of a system of providing power to a chip on a mainboard in prior art.

Comparing the system of providing power to a chip on a mainboard according to an embodiment of the present disclosure shown in FIG. 7 with the system of providing power to a chip on a mainboard in prior art shown in FIG. 6, the voltage fluctuation caused by the impedance between the post-stage power supply 3 and the chip 1 can be reduced by more than a half in the embodiment.

In the system of providing power to a chip on a mainboard according to an embodiment of the present disclosure shown in FIG. 7, the transmission path between the post-stage power supply 3 and the chip 1 in the two-stage power supply is changed from the original one to the present two, so the current in each path becomes about half of the original. For chip 1, the impedances $Z_{PDN1}$ and $Z_{PDN2}$ of the two paths are equivalent to be in parallel.

In addition, after the post-stage power supply 3 is divided into two, that is, the first post-stage power supply 30 and the second post-stage power supply 31, the volume of each of which can be half of the original post-stage power supply 3. In the spatial arrangement of a system of providing power to a chip on a mainboard in prior art shown in FIG. 6, because of the large size of the single post-stage power supply 3, it cannot utilize the area of the mainboard where high speed signal lines 4 are distributed in high density. On the other hand, in the spatial arrangement of a system of providing power to a chip on a mainboard according to an embodiment of the present disclosure shown in FIG. 7, the number of the post-stage power supplies connected to the preceding-stage power supply is increased, which can share the power of the chip 1, so, the volumetric size of each of the post-stage power supplies can be reduced. Since the sizes of the first post-stage power supply 30 and the second post-stage power supply 31 are reduced, the first post-stage power supply 30 and the second post-stage power supply 31 can utilize the area of the mainboard where the high speed signal lines 4 are distributed in high density, thereby they can be closer to the chip 1, and because of their small sizes, they can even be disposed between two adjacent wirings of the high speed signal lines 4 that are spread by an angle. Since the path between each of the first post-stage power supply 30 and the second post-stage power supply 31 and the chip 1 becomes shorter, both of the transmission impedances $Z_{PDN1}$ and $Z_{PDN2}$ shown in FIG. 7 are smaller than the transmission impedance $Z_{PDN}$ between the post-stage power supply 3 and the chip 1 shown in FIG. 6.

In this way, the transmission impedance between the first post-stage power supply 30 and the second post-stage power supply 31 and the chip 1 in the system of providing power to a chip on a mainboard according to an embodiment of the present disclosure shown in FIG. 7 is smaller than ½ of the transmission impedance between the post-stage power supply 3 and the chip 1 in the system of providing power to a chip on a mainboard in prior art shown in FIG. 6, that is, $Z_{PDN1}//Z_{PDN2}<Z_{PDN}/2$, therefore, under the same load change condition, by adopting the system of providing power to a chip on a mainboard according to an embodiment of the present disclosure shown in FIG. 7, the voltage fluctuation caused by the impedance between the first post-stage power supply 30 and the second post-stage power supply 31 and the chip 1 may be reduced to less than ½ of that in the system of providing power to a chip on a mainboard in prior art shown in FIG. 6. Considering functional requirements of the preceding-stage power supply and the post-stage power supply in the two-stage power supply architecture, the preceding-stage power supply and the post-stage power supply can be designed respectively to have different output impedances and operating frequencies.

As an embodiment, in order to meet the load dynamic requirement of the chip 1, the output impedances of the first post-stage power supply 30 and the second post-stage power supply 31 are preferably lower than the output impedance of the preceding-stage power supply 2.

As an embodiment, all of the preceding-stage power supply 2, the first post-stage power supply 30 and the second post-stage power supply 31 are switching power supplies, and operating frequencies of both the first post-stage power supply 30 and the second post-stage power supply 31 are higher than operating frequency of the preceding-stage power supply 2.

In addition, a plurality of post-stage power supplies can be designed with different output impedances, different operating frequencies, different dynamic response speeds, etc., so as to reasonably distribute performance needed by the chips, among the plurality of post-stage power supplies.

As an embodiment, the output impedance of the first post-stage power supply 30 is less than the output impedance of the second post-stage power supply 31, and the dynamic current provided by the first post-stage power supply 30 is greater than the dynamic current supplied by the second post-stage power supply 31.

As an embodiment, the operating frequency of the first post-stage power supply 30 is higher than the operating frequency of the second post-stage power supply 31, the first post-stage power supply 30 provides a high frequency component of the dynamic current of the chip 1, and the second post-stage power supply 31 provides a low frequency component of the dynamic current of the chip 1.

As an embodiment, the dynamic response speeds of both the first post-stage power supply 30 and the second post-stage power supply 31 are greater than the dynamic response speed of the preceding-stage power supply 2.

As an embodiment, the dynamic response speed of the first post-stage power supply 30 is greater than the dynamic response speed of the second post-stage power supply 31, and the output power of the first post-stage power supply 30 in response to the load dynamic change of the chip 1 is greater than the output power of the second post-stage power supply 31 in response to the same load dynamic change of the chip 1. Here, the greater the response speed is, the faster the response speed is, and the shorter the response time is.

Figure 8:
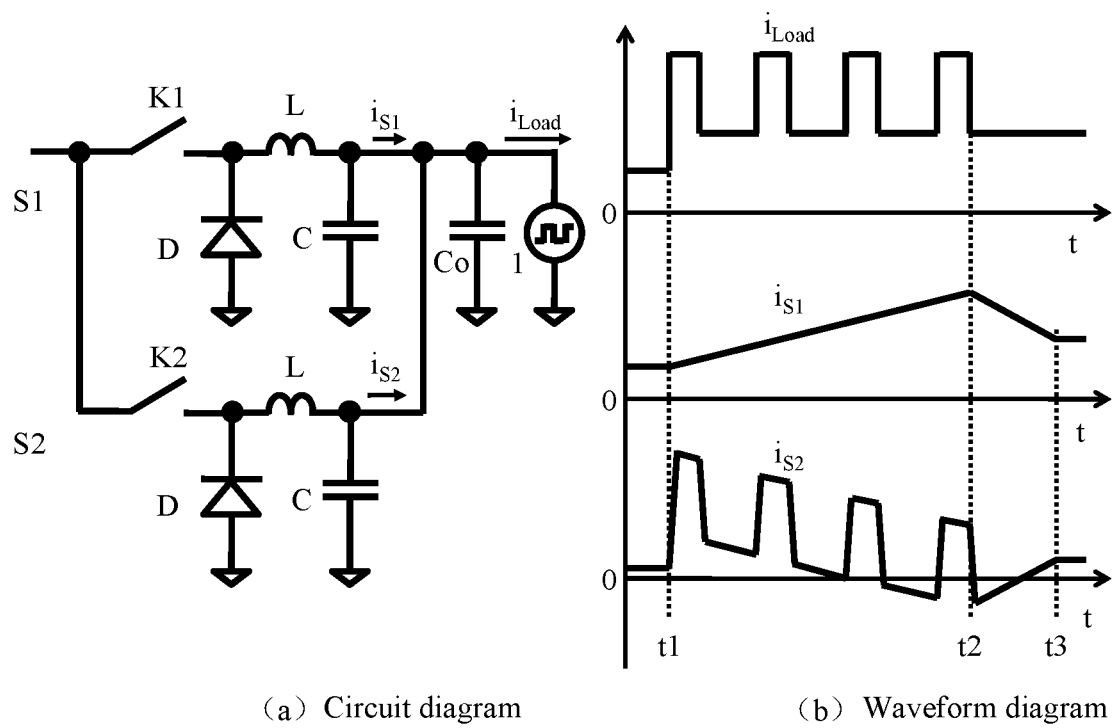
FIG. 8 is a circuit diagram of a post-stage power supply of a system of providing power to a chip on a mainboard according to an embodiment of the present disclosure, and a waveform diagram of corresponding currents during load transition.

FIG. 8 is a circuit diagram of a post-stage power supply of a system of providing power to a chip on a mainboard according to an embodiment of the present disclosure, and a waveform diagram of corresponding currents during load transition, which can intuitively explain task assignment among a plurality of post-stage power supplies. As shown in the circuit diagram (a) of FIG. 8, in the power supply system of the present embodiment, the first post-stage power supply 30 is a post-stage power supply S1 having a low operating frequency, and the second post-stage power supply 31 is a post-stage power supply S2 having a high operating frequency, the post-stage power supply S1 having the low operating frequency and the post-stage power supply S2 having the high operating frequency provide power to the chip 1 in a manner of input parallel and output parallel, wherein the post-stage power supplies S1 and S2, for example, both are typical Buck circuits. That is to say, the post-stage power supply S1 is a typical Buck circuit composed of a switch K1, a diode D, an inductor L and a capacitor C, and the post-stage power supply S2 is a typical Buck circuit composed of a switch K2, a diode D, an inductor L and a capacitor C. The capacitor Co is an output filter capacitor.

The waveform diagram (b) in FIG. 8 shows a current $i_{load}$ applied to the chip 1, a current flowing through the inductor L in the post-stage power supply S1, that is, the output current $i_{S1}$, and a current flowing through the inductor L in the post-stage power supply S2, that is, the output current $i_{S2}$, changing along with time.

Specifically, the chip 1 can be equivalent to a current source load having a high frequency variation, and the current flowing through it is $i_{Load}$. The waveform diagram (b) in FIG. 8 shows the responses of the output current $i_{S1}$ of the post-stage power supply S1 and the output current $i_{S2}$ of the post-stage power supply S2 in the case of different $i_{Load}$.

Before the time t1, that is, at time t<t1, $i_{Load}$ is in a steady-state, at which time the post-stage power supplies S1 and S2 each bears a portion of the current, here, $i_{S1} > i_{S2}$.

At time t1, $i_{Load}$ begins to change dynamically. Since the operating frequency of the post-stage power supply S2, that is, its switching frequency, is high, it has a faster dynamic response than that of the post-stage power supply S1, so, $i_{S2}$ changes rapidly following the change of $i_{Load}$, and the change of $i_{S1}$ is relatively slow.

At time t2, $i_{Load}$ is ready to enter into another steady-state.

At time t3, that is, time t>t2, both $i_{S1}$ and $i_{S2}$ have entered into a steady-state, restoring the state of $i_{S1} > i_{S2}$.

In the above courses, in the steady-state of the load of the chip 1, the post-stage power supply S1 takes on more load current, and in the dynamic-state of the load of the chip 1, the post-stage power supply S2 takes on more variation portion of the load current.

Usually, the dynamic response speed of a power supply is positively related to its operating frequency, i.e., its switching frequency, but is contradictory to power conversion efficiency. That is, a power supply with a high switching frequency, such as the post-stage power supply S2, is usually more inefficient than a power supply with a low switching frequency, such as the post-stage power supply S1, so it is difficult for a single post-stage power supply to simultaneously balance dynamic response speed and conversion efficiency. However, the system of providing power to a chip on a mainboard according to the embodiment can exert the respective advantages of the two power supplies. The system of providing power to a chip on a mainboard according to the embodiment converts a majority of the electric energy with the high efficiency post-stage power supply S1, and the efficiency of the post-stage power supply S2 has little influence on the overall conversion efficiency. At the same time, the system of providing power to a chip on a mainboard according to the embodiment responds to a majority of the load dynamic changes with the fast-dynamic-response post-stage power supply S2, so as to improve the overall dynamic response performance of the power supply system. Since the post-stage power supply S2 bears more power conversion only during the dynamic change of the load, the heat generation of the post-stage power supply S2 is less than that of the post-stage power supply S1, therefore, the requirement for heat dissipation of the post-stage power supply S2 is lower than that of the post-stage power supply S1, so the post-stage power supply S2 can be implemented in a smaller volume or can be suitable for installation in a location with poor heat dissipation. In addition, the further reduction in the volume of the post-stage power supply S2 can further reduce the distance between the post-stage power supply S2 and the chip 1, so as to reduce the path impedance of the transmission path, that is, the transmission impedance.

In addition, the present disclosure can control the first post-stage power supply 30 and the second post-stage power supply 31 in a variety of manners.

Figure 9:
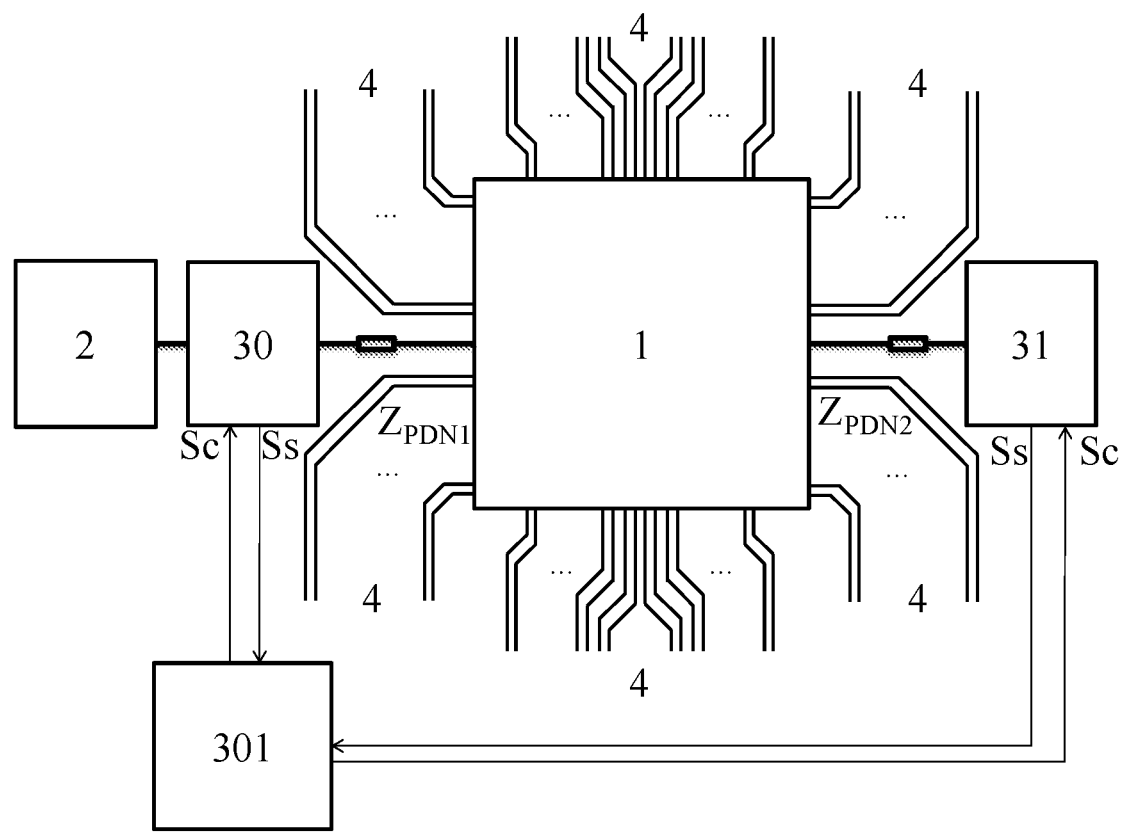
FIG. 9 is a schematic diagram of the spatial arrangement of a system of providing power to a chip on a mainboard according to another embodiment of the present disclosure.

FIG. 9 is a schematic diagram of the spatial arrangement of a system of providing power to a chip on a mainboard according to another embodiment of the present disclosure. As shown in FIG. 9, the power supply system of this embodiment may further include: a post-stage power supply controller 301, located on the mainboard 5, configured to control the operation of the first post-stage power supply 30 and the second post-stage power supply 31, for example, the post-stage power supply controller 301 receives sampling signal Ss from the first post-stage power supply 30 and the second post-stage power supply 31 and send control signal Sc to the first post-stage power supply 30 and the second post-stage power supply 31. That is to say, the first post-stage power supply 30 and the second post-stage power supply 31 distributed in different areas on the mainboard can be controlled by the same post-stage power supply controller 301, and different types of the first post-stage power supply 30 and the second post-stage power supply 31 can be controlled in the same control manner or different control manners, so as to achieve different characteristic requirements.

Since the output voltages of the first post-stage power supply 30 and the second post-stage power supply 31 distributed on two sides of the chip 1 may be in a parallel relationship, the differences between the steady-state voltages and between the dynamic responses may cause voltage or current oscillation, and thus the first post-stage power supply 30 and the second post-stage power supply 31 distributed on the two sides of the chip 1 can be controlled by the same post-stage power supply controller 301. However, as shown in FIG. 9, if the post-stage power supply controller 301 is close to the first post-stage power supply 30 at one side of the chip 1, the path for transmitting the sampling signal Ss and the control signal Sc between the post-stage power supply controller 301 and the second post-stage power supply 31 close to the other side of the chip 1 is longer than the path between the post-stage power supply controller 301 and the first post-stage power supply 30, and it is necessary to cross or bypass the entire chip 1 and to approach or cross the high speed signal line 4. Such a spatial arrangement may have the following problems. The sampling signal Ss transmitted from the farther second post-stage power supply 31 to the post-stage power supply controller 301 may generate more distortion or suffer more interference due to a longer distance, thus affecting the control effect. The sampling signal Ss transmitted from the farther second post-stage power supply 31 to the post-stage power supply controller 301 may cause interference to the high speed signal lines 4 because it approaches or crosses with the high speed signal lines 4, thus affecting the function or performance of the host system. The control signal Sc transmitted from the post-stage power supply controller 301 to the farther post-stage power supply 31 may generate more delay due to a longer distance, thus affecting the control effect. The control signal Sc transmitted from the post-stage power supply controller 301 to the farther post-stage power supply 31 may cause interference to the high speed signal lines 4 because it approaches or crosses with the high speed signal lines 4, thus affecting the function or performance of the host system.

Figure 10:
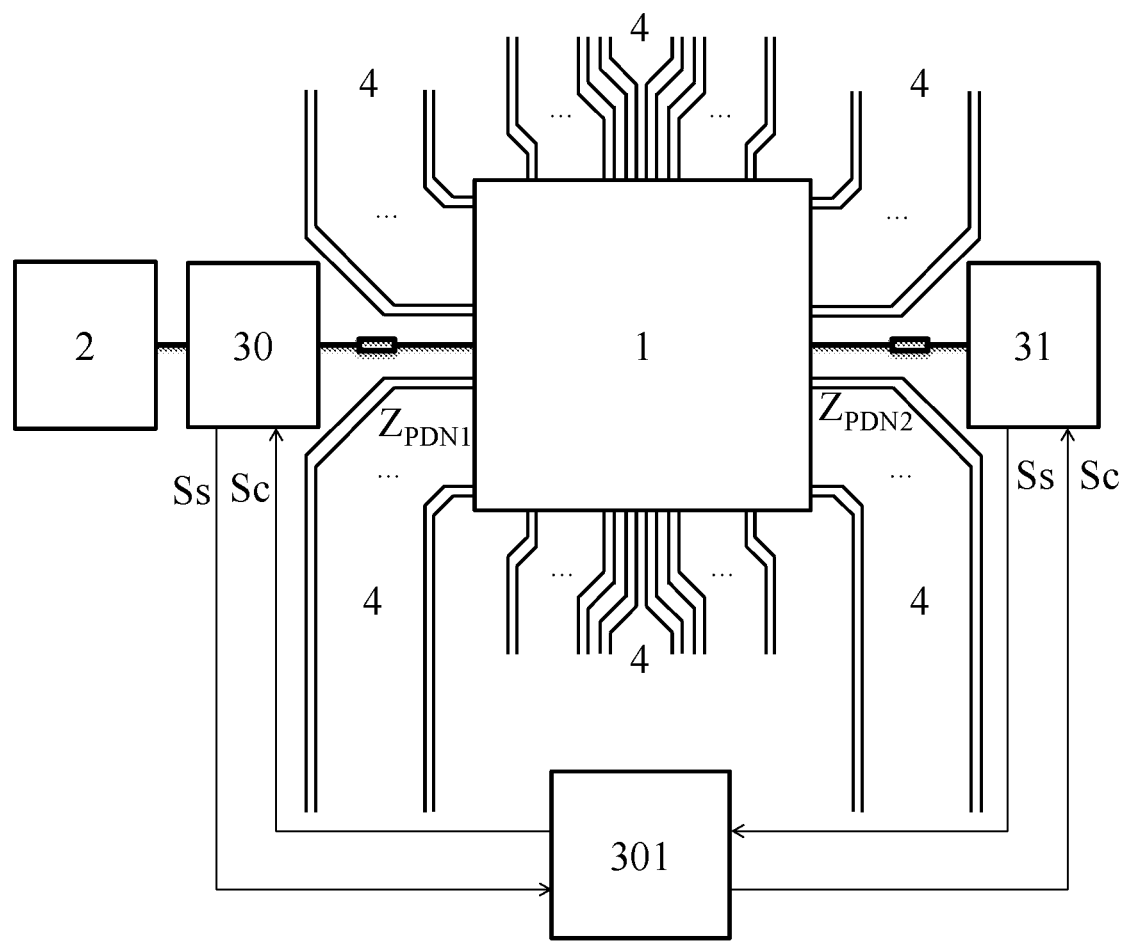
FIG. 10 is a schematic diagram of the spatial arrangement of a system of providing power to a chip on a mainboard according to further another embodiment of the present disclosure.

FIG. 10 is a schematic diagram of the spatial arrangement of a system of providing power to a chip on a mainboard according to further another embodiment of the present disclosure. The spatial arrangement of a system of providing power to a chip on a mainboard shown in FIG. 10 is only a variant of the spatial arrangement of a system of providing power to a chip on a mainboard shown in FIG. 9. As shown in FIG. 10, the post-stage power supply controller 301 is placed at a position equidistant from the first post-stage power supply 30 and the second post-stage power supply 31 on the two sides of the chip 1. However, such a spatial arrangement may still have the following problems. The sampling signal Ss transmitted from the first post-stage power supply 30 and the second post-stage power supply 31 to the post-stage power supply controller 301 may be distorted or suffer interference due to long distances, thus affecting the control effect. The sampling signal Ss transmitted from the first post-stage power supply 30 and the second post-stage power supply 31 to the post-stage power supply controller 301 may cause interference to the high speed signal lines 4 because they approaches or crosses with the high speed signal lines 4, thus affecting the function or performance of the host system. The control signal Sc transmitted from the post-stage power supply controller 301 to the first post-stage power supply 30 and the second post-stage power supply 31 may cause interference to the high speed signal lines 4 because they approaches or crosses with the high speed signal lines 4, thus affecting the function or performance of the host system. The post-stage power supply controller 301 itself is close to or overlaps with the high speed signal lines 4, which is susceptible to suffer interference or generate interference, thus affecting the performance of the host system.

Figure 11:
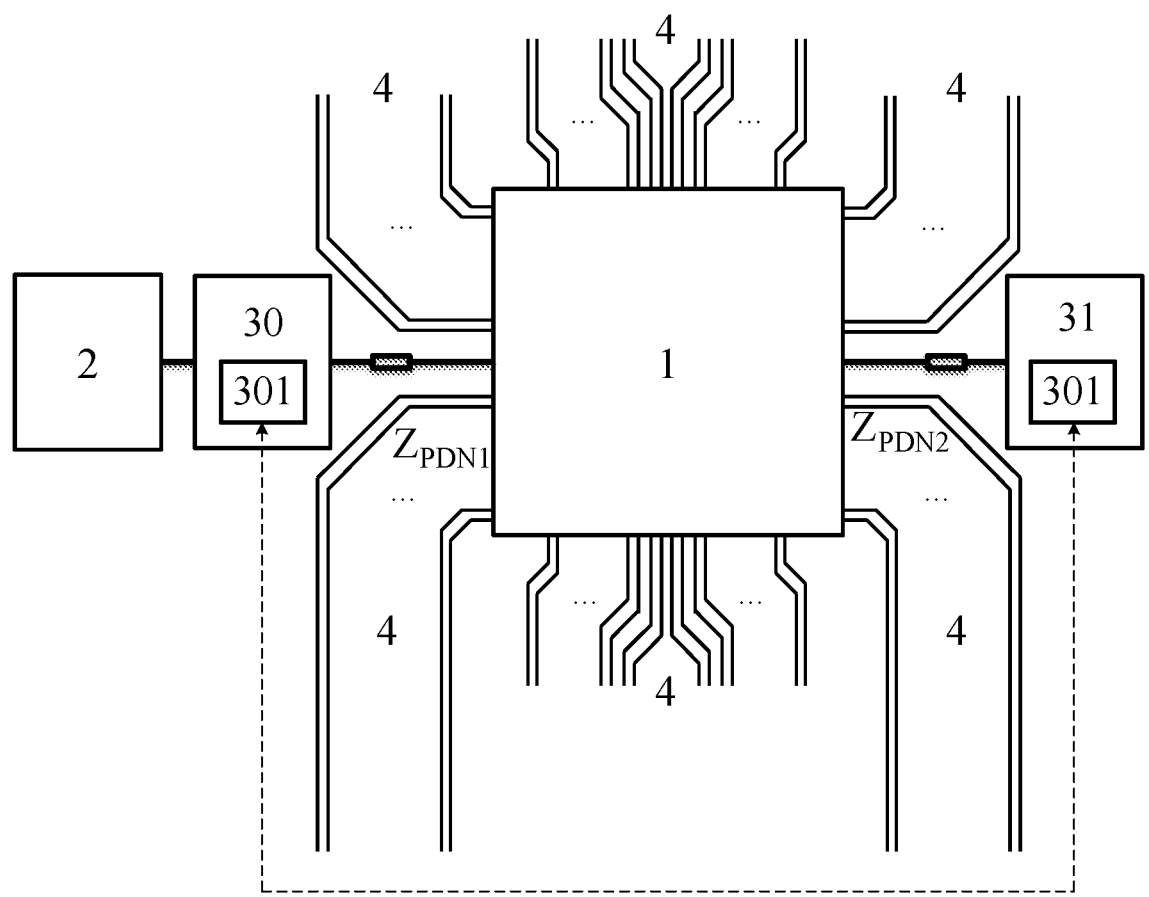
FIG. 11 is a schematic diagram of the spatial arrangement of a system of providing power to a chip on a mainboard according to still another embodiment of the present disclosure.

FIG. 11 is a schematic diagram of the spatial arrangement of a system of providing power to a chip on a mainboard according to still another embodiment of the present disclosure. As shown in FIG. 11, in the power supply system of the present embodiment, each of the first post-stage power supply 30 and the second post-stage power supply 31 may include: a post-stage power supply controller 301, wherein the post-stage power supply controller 301 of the first post-stage power supply 30 and the post-stage power supply controller 301 of the second post-stage power supply 31 have signal connections, so as to cooperate with each other, to control the operation of the first post-stage power supply 30 or the second post-stage power supply 31. Each of the post-stage power supply controllers 301 can control in the same control manner or different control manners, so as to achieve different characteristic requirements. That is to say, the first post-stage power supply 30 and the second post-stage power supply 31 in different areas of the mainboard respectively have respective post-stage power supply controllers 301, and the respective post-stage power supply controller 301 have signal connections among each other, for example, to realize load current distribution, current sharing, voltage regulation and synchronization.

In an embodiment, the current sharing includes: steady-state current sharing, that is, the DC currents of the respective post-stage power supplies are substantially equal in a steady-state; and dynamic current sharing, that is, the currents of the respective power supplies in the course of dynamic transition of the load are substantially equal, so current sharing makes the currents of all of the post-stage power supplies approximately equal.

In an embodiment, the load current distribution includes: steady-state load current distribution, that is, the DC currents may be unevenly distributed among different post-stage power supplies in a steady-state, for example, may be distributed according to an efficiency optimization manner; and dynamic load current distribution, that is, in the course of dynamic transition of the load current, the currents may be unevenly distributed among different post-stage power supplies, for example, may be distributed according to output impedance characteristics of the respective post-stage power supplies.

In an embodiment, the manner of realizing dynamic load current distribution according to output impedance characteristics of the respective post-stage power supplies include: the post-stage power supply with low output impedance bears a majority portion of the transition current and the post-stage power supply with relatively high output impedance bears a minority portion of the transition current; or the post-stage power supply with low output impedance bears the portion of the transition current with high frequency and the output impedance with relatively high output impedance bears the portion of the transition current with low frequency.

In an embodiment, the ratio of steady-state load current distribution of the respective post-stage power supplies may be the same as or different from the ratio of dynamic load current distribution of the respective post-stage power supplies. For example, a post-stage power supply with low output impedance bears a majority portion of the transition current and a minority portion of the steady-state current, and a post-stage power supply with relatively high output impedance bears a minority portion of the transition current and a majority portion of the steady-state current.

As shown in FIG. 11, since the first post-stage power supply 30 and the second post-stage power supply 31 on the two sides of the chip 1 do not need to be controlled by the same post-stage power supply controller, the post-stage power supply controller 301 on each side can be respectively and directly disposed in the vicinity of the corresponding first post-stage power supply 30 or second post-stage power supply 31, to approach them more closely, so as to avoid the above-mentioned problems exist in the system of providing power to a chip on a mainboard according to the embodiments of the present disclosure shown in FIGS. 9 and 10.

In addition, since the power that needs to be controlled by each of the post-stage power supply controllers 301 on the two sides of the chip 1 is half of the power that needs to be controlled by only one post-stage power supply controller, the complexity of the post-stage power supply controller 301 can be correspondingly reduced.

Figure 12:
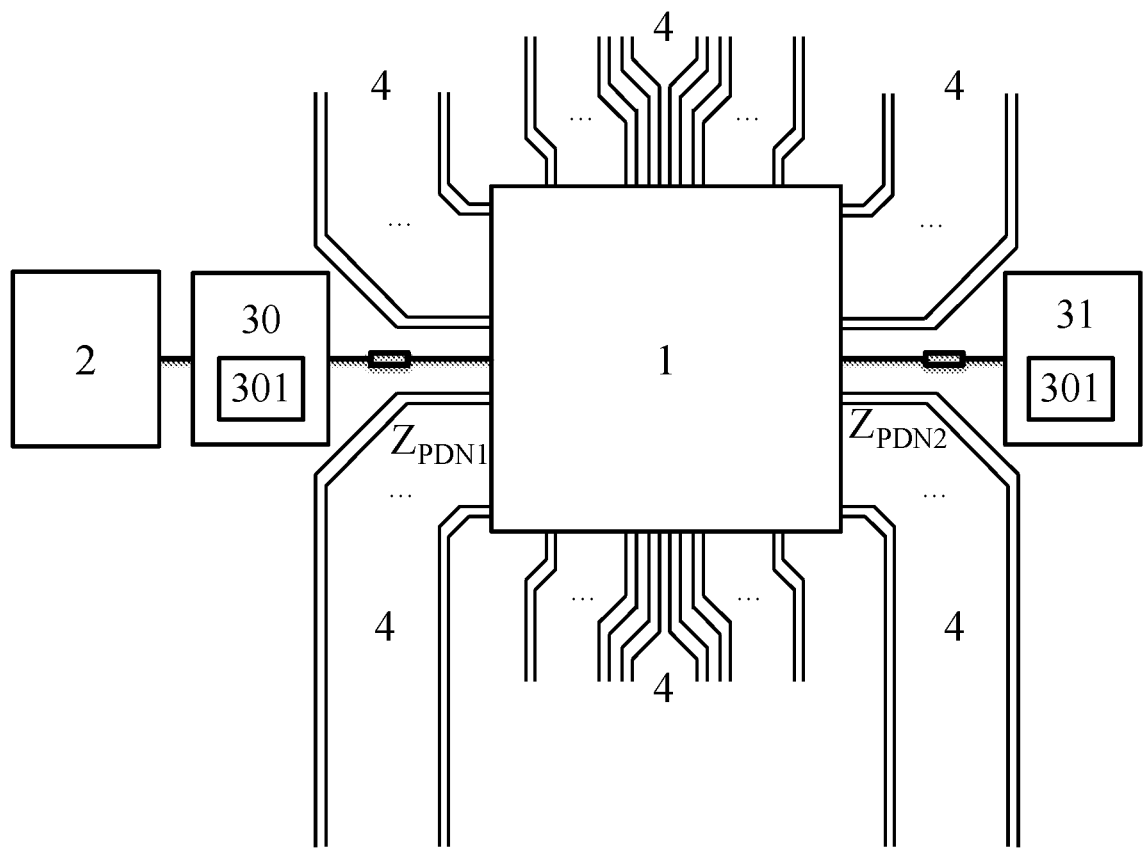
FIG. 12 is a schematic diagram of the spatial arrangement of a system of providing power to a chip on a mainboard according to still another embodiment of the present disclosure.

FIG. 12 is a schematic diagram of the spatial arrangement of a system of providing power to a chip on a mainboard according to still another embodiment of the present disclosure. As shown in FIG. 12, in the power supply system of the present embodiment, each of the first post-stage power supply 30 and the second post-stage power supply 31 may include: a post-stage power supply controller 301, configured to separately control the operation of the corresponding first post-stage power supply 30 or the corresponding second post-stage power supply 31. Unlike the embodiment of FIG. 11, in the embodiment shown in FIG. 12, there may be no signal connection between the post-stage power supply controllers 301 of the first post-stage power supply 30 and that of the second post-stage power supply 31.

Figure 13:
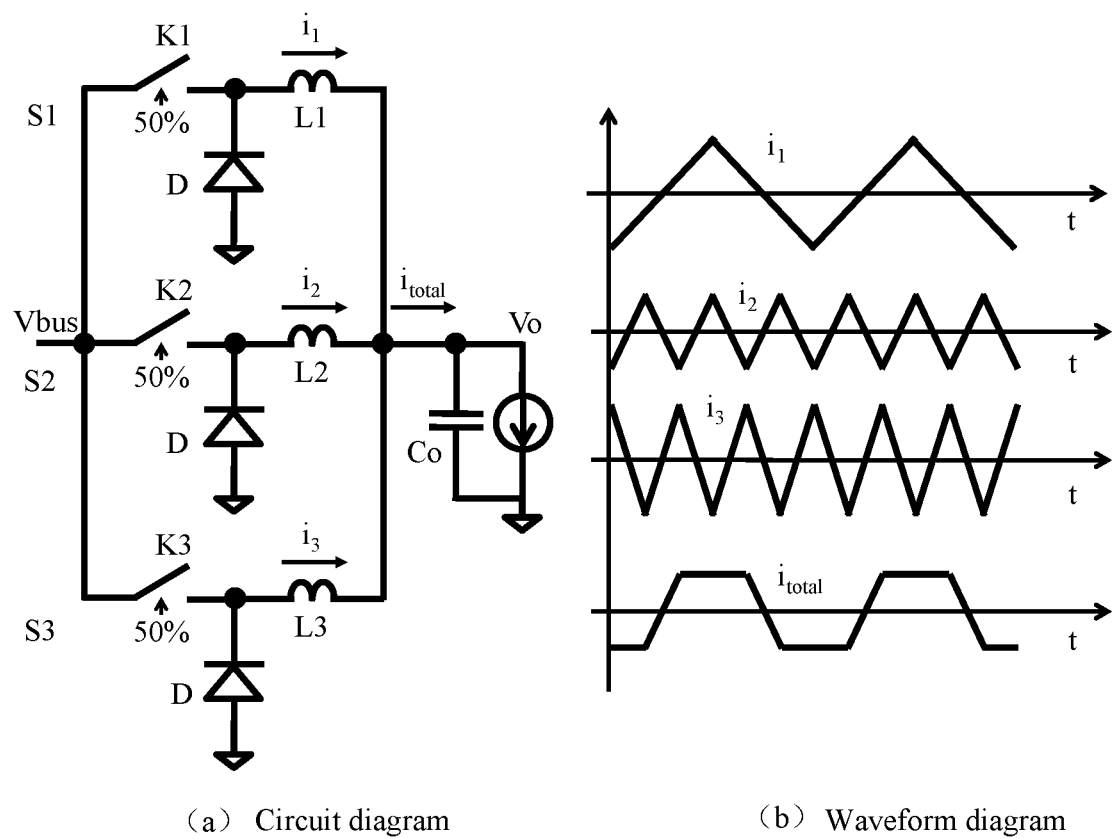
FIG. 13 is a circuit diagram of a post-stage power supply of a system of providing power to a chip on a mainboard according to another embodiment of the present disclosure, and a waveform diagram of corresponding currents.

FIG. 13 is a circuit diagram of a post-stage power supply of a system of providing power to a chip on a mainboard according to another embodiment of the present disclosure, and a waveform diagram of corresponding currents. As shown in the circuit diagram (a) of FIG. 13, in the power supply system of the present embodiment, a post-stage power supply S1 having a low operating frequency and two post-stage power supplies S2 and S3 having a high operating frequency provide power to the chip 1 in a manner of input parallel and output parallel, wherein all of the post-stage power supplies S1, S2 and S3, for example, are typical Buck circuits. That is to say, the post-stage power supply S1 is a typical Buck circuit composed of a switch K1, a diode D and an inductor L1, the post-stage power supply S2 is a typical Buck circuit composed of a switch K2, a diode D and an inductor L2, and the post-stage power supply S3 is a typical Buck circuit composed of a switch K3, a diode D and an inductor L3. The capacitor Co is an output filter capacitor.

For example, the duty ratios of all of the post-stage power supplies S1, S2 and S3 shown in the circuit diagram (a) in FIG. 13 are 50%, and the ratio of the operating frequencies of the post-stage power supplies S1, S2 and S3, that is, switching frequencies f1, f2 and f3, is f1:f2:f3=1:3:3, the initial phases of the post-stage power supplies S1, S2 and S3 are 0 degrees, 0 degrees and 180 degrees respectively, the ratio of the inductance values of the output inductors L1, L2 and L3 of the post-stage power supplies S1, S2 and S3, is L1:L2:L3=3:2:1, and $i_1$, $i_2$ and $i_3$ are currents flowing through the output inductors L1, L2 and L3 respectively.

The waveform diagram (b) in FIG. 13 shows the waveforms of the currents $i_1$, $i_2$ and $i_3$ flowing through the output inductors L1, L2 and L3 respectively and the current $i_{total}$ applied to the chip 1. As shown in the waveform diagram (b) in FIG. 13, the waveform of the total output current of the post-stage power supplies S1, S2 and S3, that is, the waveform of the current $i_{total}$ is formed by adding the currents $i_1$, $i_2$ and $i_3$. It can be seen that the peak-to-peak value of the current $i_{total}$ is less than or equal to the peak-to-peak value of any one of the currents $i_1$, $i_2$ and $i_3$, and the waveform of the current $i_{total}$ is a trapezoidal wave, which is smoother than the triangular wave, then effectively reducing high frequency components and electromagnetic noise that may be brought by the high frequency components.

The post-stage power supplies S1, S2 and S3 in FIG. 13 can be reduced to two, that is, only the aforementioned first post-stage power supply 30 and second post-stage power supply 31 are employed. As an embodiment, the first post-stage power supply 30 and the second post-stage power supply 31 are switching power supplies, and the operating frequency f1 of the first post-stage power supply 30 is N times the operating frequency f2 of the second post-stage power supply 31, where N is an integer greater than 1, the output currents $i_1$ and $i_2$ of the first post-stage power supply 30 and the second post-stage power supply 31 have ripples of different phases, and the outputs of the first post-stage power supply 30 and the second post-stage power supply 31 are connected in parallel, such that the ripple after superposition is reduced.

In practical applications, the aforementioned post-stage power supplies S1, S2 and S3 can be implemented by parallel connection of different types and numbers of sub-modules, and the phase relationship among the sub-modules can be optimized according to actual needs.

Figure 14:
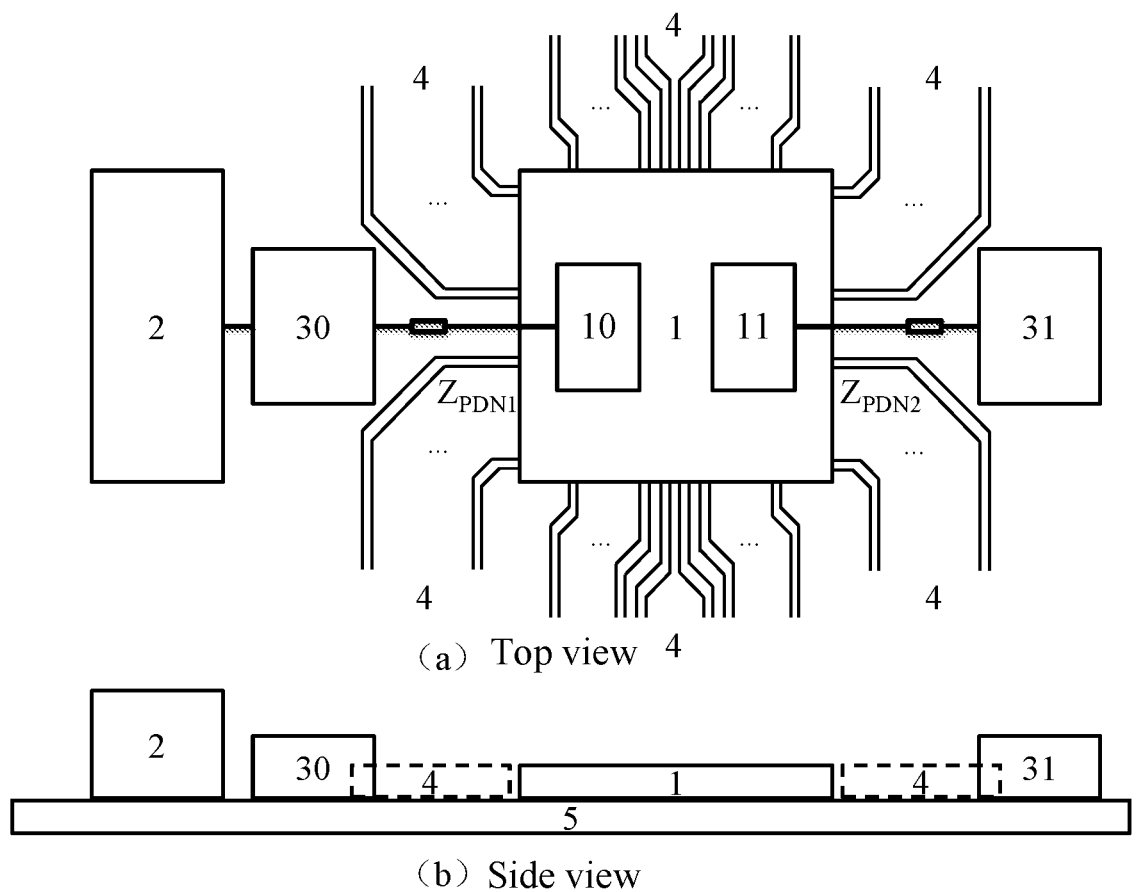
FIG. 14 is a schematic diagram of the spatial arrangement of a system of providing power to a chip on a mainboard according to still another embodiment of the present disclosure.

FIG. 14 is a schematic diagram of the spatial arrangement of a system of providing power to a chip on a mainboard according to still another embodiment of the present disclosure. As shown in FIG. 14, in the power supply system of the present embodiment, the chip 1 is a multicore chip, such as a multicore processor chip, including at least a first core 10 and a second core 11. The first post-stage power supply 30 provides a third DC voltage to the first core 10, and the second post-stage power supply 31 provides a fourth DC voltage to the second core 11. The third DC voltage and the fourth DC voltage may be the same or different.

The processor chips used in data centers are usually multicore processors with powerful computing capacity, each of which contains a plurality of computing cores, the physical composition of each core is relatively separate, and the power supply for the cores can be separate to each other. In the power supply manner of the system of providing power to a chip on a mainboard according to the embodiment of the present disclosure shown in FIG. 14, the cores of the chip 1 is divided into two groups 10 and 11, each of which is powered by one post-stage power supply at the corresponding side of the chip 1. In this way, different core groups can be provided with different optimal voltages according to the work tasks being processed by them, that is, the third DC voltage and the fourth DC voltage can be unequal, so that the performance to power of the chip 1 can be optimized.

Figure 15:
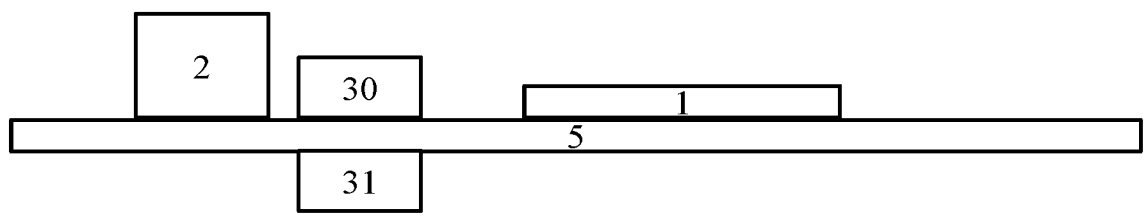
FIG. 15 is a schematic diagram of the spatial arrangement of a system of providing power to a chip on a mainboard according to still another embodiment of the present disclosure.

FIG. 15 is a schematic diagram of the spatial arrangement of a system of providing power to a chip on a mainboard according to still another embodiment of the present disclosure. As shown in FIG. 15, in the power supply system of the present embodiment, the preceding-stage power supply 2 and the first post-stage power supply 30 are located on a first side of the mainboard 5, such as the upper surface, and the second post-stage power supply 31 is located on the second side of the mainboard 5, such as the lower surface.

Figure 16:
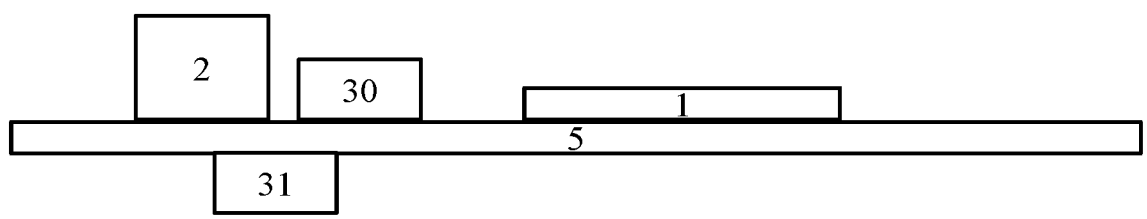
FIG. 16 is a schematic diagram of the spatial arrangement of a system of providing power to a chip on a mainboard according to still another embodiment of the present disclosure.

FIG. 16 is a schematic diagram of the spatial arrangement of a system of providing power to a chip on a mainboard according to still another embodiment of the present disclosure. As shown in FIG. 16, in the power supply system of the present embodiment, the projections of the preceding-stage power supply 2 and the second post-stage power supply 31 on the mainboard 5 are at least partially overlapped.

As an embodiment, as shown in FIG. 16, the projections of the first post-stage power supply 30 and the second post-stage power supply 31 on the mainboard 5 are at least partially overlapped.

Figure 17:
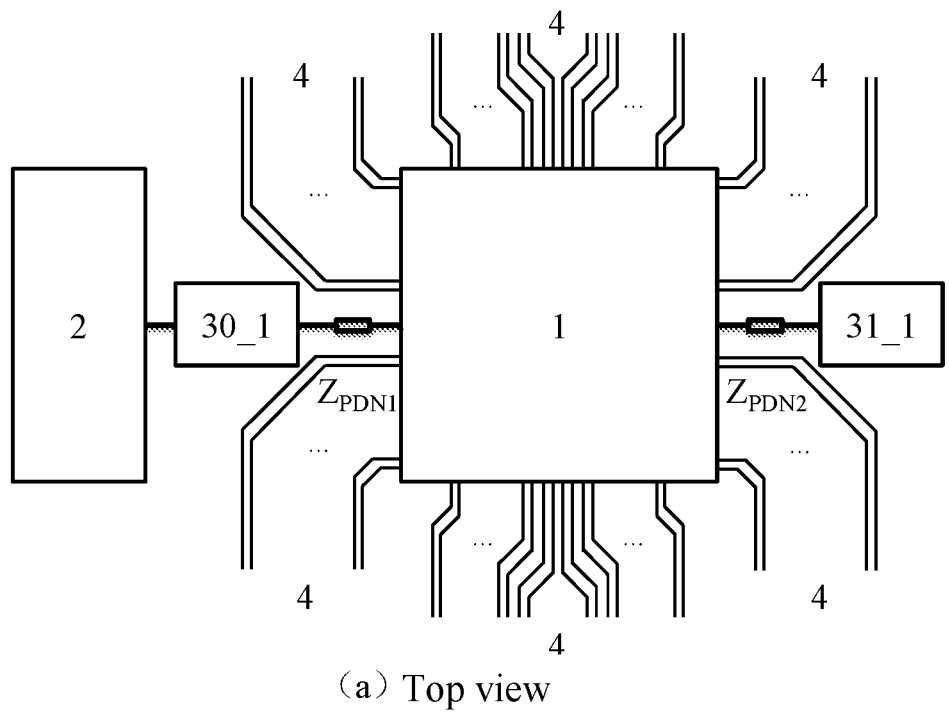
FIG. 17 is a schematic diagram of the spatial arrangement of a system of providing power to a chip on a mainboard according to still another embodiment of the present disclosure.
Figure 17:
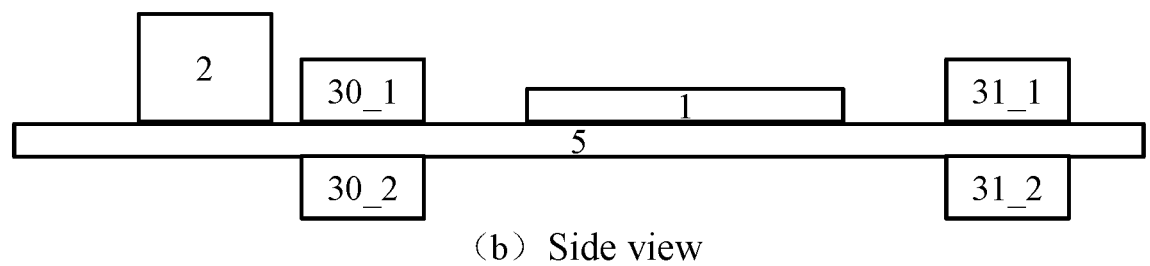

FIG. 17 is a schematic diagram of the spatial arrangement of a system of providing power to a chip on a mainboard according to still another embodiment of the present disclosure. As shown in FIG. 17, in the power supply system of the present embodiment, the first post-stage power supply 30 is actually further composed of a post-stage power supply 30_1 and a post-stage power supply 30_2, and the second post-stage power supply 31 is actually further composed of a post-stage power supply 31_1 and a post-stage power supply 31_2, wherein the post-stage power supply 30_1 and the post-stage power supply 30_2 are located on different surfaces of the mainboard 5, and the post-stage power supply 31_1 and the post-stage power supply 31_2 are located on different surfaces of the mainboard 5. When the post-stage power supply 30_1 and the post-stage power supply 30_2 are located on different surfaces of the mainboard 5, or the post-stage power supply 31_1 and the post-stage power supply 312 are located on different surfaces of the mainboard 5, their projections on the mainboard 5 may be separate from each other, partially overlapped, or completely overlapped.

In the embodiments of the present disclosure shown in FIGS. 15-17, the preceding-stage power supply 2, the first post-stage power supply 30, the second post-stage power supply 31, the post-stage power supply 301, the post-stage power supply 30_2, the post-stage power supply 31_1 and the post-stage power supply 31_2 can be arranged on different surfaces of the mainboard 5 of a system as much as possible, so as to reduce the area occupied in one surface of the mainboard 5, so that the first post-stage power supply 30, the second post-stage power supply 31, the post-stage power supply 301, the post-stage power supply 30_2, the post-stage power supply 31_1 and the post-stage power supply 31_2 may be closer to the chip 1.

Figure 18:
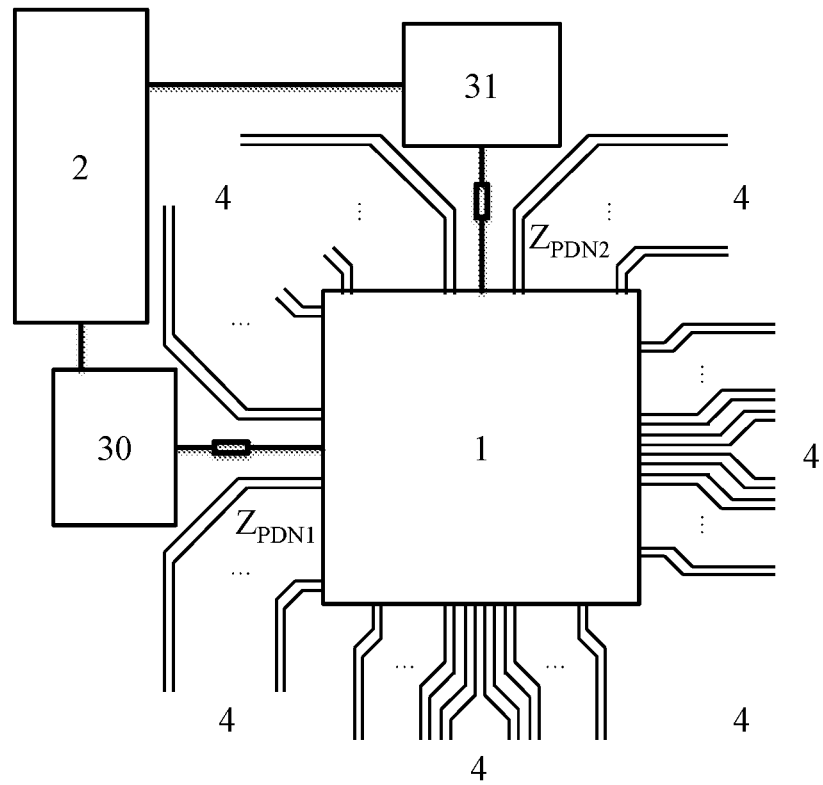
FIG. 18 is a schematic diagram of the spatial arrangement of a system of providing power to a chip on a mainboard according to still another embodiment of the present disclosure.
Figure 18:
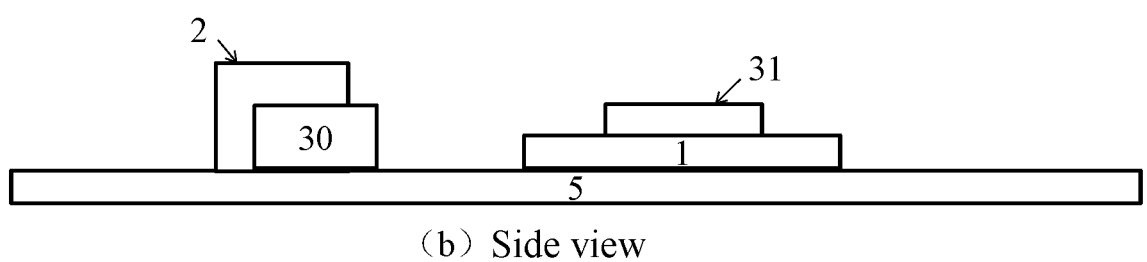

FIG. 18 is a schematic diagram of the spatial arrangement of a system of providing power to a chip on a mainboard according to still another embodiment of the present disclosure. As shown in the top view (a) and the side view (b) of FIG. 18, in the power supply system of the present embodiment, the first post-stage power supply 30 and the second post-stage power supply 31 are respectively located on two adjacent sides of the chip 1. The first post-stage power supply 30 and the second post-stage power supply 31 are not limited to being located on two adjacent sides of the chip 1, and may be located on two opposite sides of the chip 1 as shown in FIGS. 7, 9-12, 14 and 17.

Figure 19:
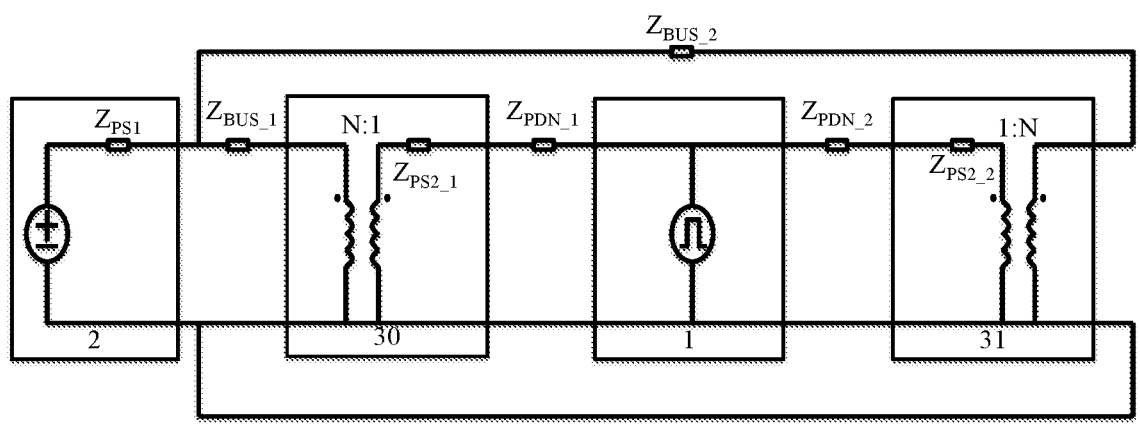
FIG. 19 is an equivalent circuit diagram of a system of providing power to a chip on a mainboard according to an embodiment of the present disclosure.

FIG. 19 is an equivalent circuit diagram of a system of providing power to a chip on a mainboard according to an embodiment of the present disclosure, that is, an equivalent circuit of the system of providing power to a chip on a mainboard in the foregoing FIGS. 7, 9-12, 14, 17 and 18. As shown in FIG. 19, in the power supply structure shown in FIGS. 7, 9-12, 14, 17 and 18, the power supply impedance is composed of the following parts: the equivalent output impedance $Z_{PS1}$ of the preceding-stage power supply 2, the impedance $Z_{BUS\_1}$ of the intermediate low-voltage bus line between the preceding-stage power supply 2 and the first post-stage power supply 30, the equivalent output impedance $Z_{PS2\_1}$ of the first post-stage power supply 30, the transmission impedance $Z_{PDN\_1}$ between the first post-stage power supply 30 and the chip 1, the impedance $Z_{BUS\_2}$ of the intermediate low-voltage bus line between the preceding-stage power supply 2 and the post-stage power supply 31, the equivalent output impedance $Z_{PS2\_2}$ of the post-stage power supply 31, and the transmission impedance $Z_{PDN\_2}$ between the post-stage power supply 31 and the chip 1. In FIG. 19, the first post-stage power supply 30 is equivalent to a model in which an ideal transformer having a certain voltage conversion ratio is connected in series with an equivalent output impedance $Z_{PS2\_1}$, and the second post-stage power supply 31 is equivalent to a model in which an ideal transformer having a certain voltage conversion ratio is connected in series with an equivalent output impedance $Z_{PS2\_2}$, where N represents the multiple of the respective input voltages to the corresponding output voltages of the first post-stage power supply 30 and the second post-stage power supply 31 respectively.

At first, since the distances between the preceding-stage power supply 2 and the first post-stage power supply 30 and the second post-stage power supply 31 on the two sides of the chip 1 are asymmetric, the impedance between the preceding-stage power supply 2 and the farther second post-stage power supply 31, that is, the impedance $Z_{BUS\_2}$ of the intermediate low-voltage bus line in FIG. 19, is greater than the impedance between the preceding-stage power supply 2 and the closer first post-stage power supply 30. Based on the equivalent circuit shown in FIG. 19, the overall impedance of the power supply structure shown in FIGS. 7, 9-12, 14, 17 and 18 can be derived, that is, $$Z=Z_{PS1}/N^2+(Z_{BUS\_1}/N^2+Z_{PS2\_1}+Z_{PDN\_1})//(Z_{BUS\_2}/N^2+Z_{PS2\_2}+Z_{PDN\_2}) \quad \text{(Formula 4)},$$

wherein, the arithmetic symbol "//" represents the parallel connection of impedances, the same below.

When the first post-stage power supply 30 and the second post-stage power supply 31 are the aforementioned Buck circuit, $$Z=Z_{PS1}*d^2+(Z_{BUS\_1}*d^2+Z_{PS2\_1}+Z_{PDN\_1})//\\(Z_{BUS\_2}*d^2+Z_{PS2\_2}+Z_{PDN\_2}) \quad \text{(Formula 5).}$$

During the dynamic transition of the load, d≈1, therefore, $$Z\approx Z_{PS1}+(Z_{BUS\_1}+Z_{PS2\_1}+Z_{PDN\_1})//(Z_{BUS\_2}+Z_{PS2\_2}+Z_{PDN\_2}) \quad \text{(Formula 6).}$$

It can be known from Formula 6 that if $Z_{BUS\_2}$ is much larger than $Z_{PS2\_2}+Z_{PDN\_2}$, $Z_{BUS\_2}$ will dominate the impedance of the branch, so that the advantages of high operating frequency and small volume of the second post-stage power supply 31 cannot be exerted, and the large $Z_{BUS\_2}$ will cause large loss of steady-state transmission, thereby reducing the power supply efficiency of the power supply system, therefore, when using the implementation of the power supply structure shown in FIGS. 7, 9-12, 14, 17 and 18 of the present disclosure, it is preferable to satisfy $Z_{BUS\_2} \leq 5*(Z_{PS2\_2}+Z_{PDN\_2})$, but the disclosure is not limited thereto.

Figure 20:
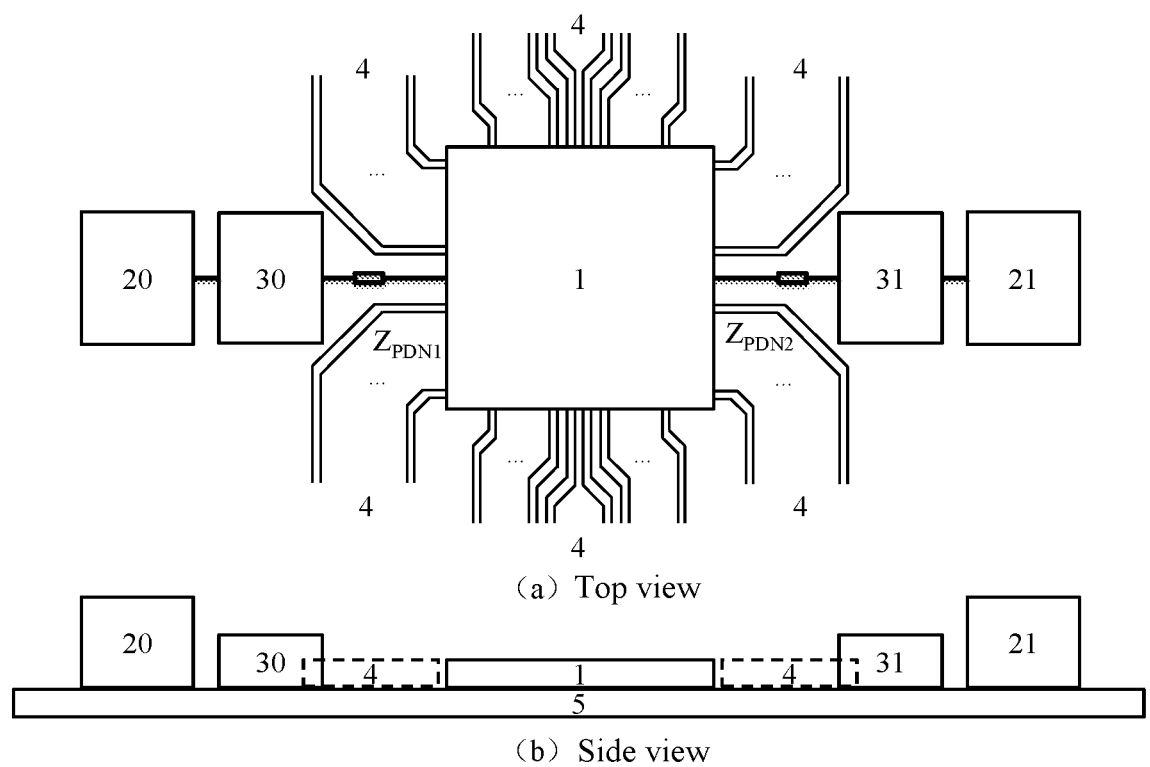
FIG. 20 is a schematic diagram of the spatial arrangement of a system of providing power to a chip on a mainboard according to still another embodiment of the present disclosure.

FIG. 20 is a schematic diagram of the spatial arrangement of a system of providing power to a chip on a mainboard according to still another embodiment of the present disclosure. Different from the previous embodiments in which one preceding-stage power supply corresponds to a plurality of post-stage power supplies, the embodiment of FIG. 20 provides a scheme in which a plurality of preceding-stage power supplies respectively correspond to one or more post-stage power supplies. As shown in the top view (a) and the side view (b) of FIG. 20, the system of providing power to a chip on a mainboard according to the embodiment of the present disclosure includes a first preceding-stage power supply 20, a second preceding-stage power supply 21, a first post-stage power supply 30, and a second post-stage power supply 31, all of which are DC-DC converters for supplying power to the chip 1 disposed on the mainboard 5, wherein the chip 1 is, for example, a processor chip.

Both the first preceding-stage power supply 20 and the second preceding-stage power supply 21 are located on the mainboard 5, and both are configured to receive a first DC voltage (e.g., 400V, 48V, 12V, etc.), the first preceding-stage power supply 20 provides a second DC voltage (e.g., 12V, 6V, 3.3V, etc.), the second preceding-stage power supply 21 provides a third DC voltage (e.g., 12V, 6V, 3.3V, etc.), and the first DC voltage is greater than the second DC voltage and the third DC voltage. The second DC voltage and the third DC voltage may be the same or different.

Both the first post-stage power supply 30 and the second post-stage power supply 31 are located on the mainboard 5, wherein the first post-stage power supply 30 is electrically connected to the first preceding-stage power supply 20 to receive the second DC voltage, the second post-stage power supply 31 is electrically connected to the second preceding-stage power supply 21 to receive the third DC voltage, the first post-stage power supply 30 is disposed at the first side of the chip 1, the second post-stage power supply 31 is disposed at the second side of the chip 1, the distance on the mainboard 5 between the first post-stage power supply 30 and the chip 1 is less than or equal to the distance between the first preceding-stage power supply 20 and the chip 1, and the distance on the mainboard 5 between the second post-stage power supply 31 and the chip 1 is less than or equal to the distance between the second preceding-stage power supply 21 and the chip 1, the first post-stage power supply 30 provides a fourth DC voltage to the chip 1, the second DC voltage is greater than the fourth DC voltage (for example, 2V), the second post-stage power supply 31 provides a fifth DC voltage to the chip 1, and the third DC voltage is greater than the fifth DC voltage (for example, 1V). The fourth DC voltage and the fifth DC voltage may be the same or different. The high speed signal lines 4 are the same as the above, and will not be repeated here.

Figure 21:
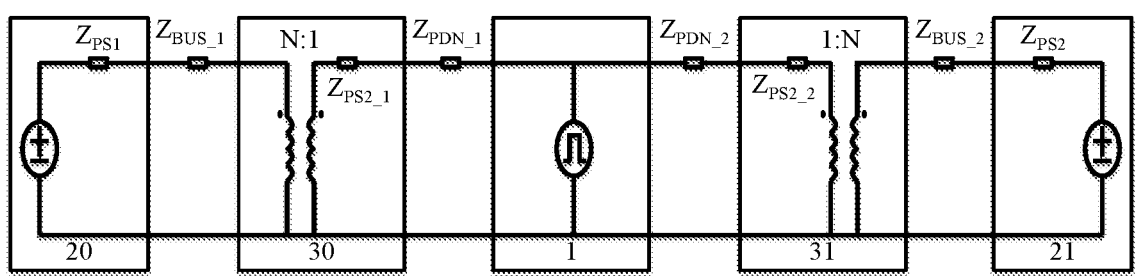
FIG. 21 is an equivalent circuit diagram of a system of providing power to a chip on a mainboard according to another embodiment of the present disclosure.

FIG. 21 is an equivalent circuit diagram of a system of providing power to a chip on a mainboard according to another embodiment of the present disclosure, that is, an equivalent circuit of the system of providing power to a chip on a mainboard in FIG. 20. As shown in FIG. 21, in the power supply structure shown in FIG. 20, the power supply impedance is composed of the following parts: the equivalent output impedance $Z_{PS1}$ of the first preceding-stage power supply 20, the impedance $Z_{BUS\_1}$ of the intermediate low-voltage bus line between the first preceding-stage power supply 20 and the first post-stage power supply 30, the equivalent output impedance $Z_{PS2\_1}$ of the first post-stage power supply 30, the transmission impedance $Z_{PDN\_1}$ between the first post-stage power supply 30 and the chip 1, the equivalent output impedance $Z_{PS2}$ of the second preceding-stage power supply 21, the impedance $Z_{BUS\_2}$ of the intermediate low-voltage bus line between the second preceding-stage power supply 21 and the second post-stage power supply 31, the equivalent output impedance $Z_{PS2\_2}$ of the second post-stage power supply 31, and the transmission impedance $Z_{PDN\_2}$ between the second post-stage power supply 31 and the chip 1. In FIG. 21, the first post-stage power supply 30 is equivalent to a model in which an ideal transformer having a certain voltage conversion ratio is connected in series with an equivalent output impedance $Z_{PS2\_1}$, and the second post-stage power supply 31 is equivalent to a model in which an ideal transformer having a certain voltage conversion ratio is connected in series with an equivalent output impedance $Z_{PS2\_2}$, where N represents the multiple of the respective input voltages to the corresponding output voltages of the first post-stage power supply 30 and the second post-stage power supply 31 respectively.

In the embodiment of FIG. 20, the preceding-stage power supply 2 is divided into two parts, that is, a first preceding-stage power supply 20 and a second preceding-stage power supply 21, and are disposed on two sides of the chip 1 respectively.

Compared with the system of providing power to a chip on a mainboard according to the embodiments of the present disclosure shown in FIGS. 7, 9-12, 14, 17 and 18, in the system of providing power to a chip on a mainboard according to the embodiment of the present disclosure shown in FIG. 20, the power supply structure and impedance of the two sides of the chip 1 are symmetrical, so that load balance in the power supply paths of the two sides of the chip 1 can be easily realized in both steady-state and dynamic-state, thereby maximally utilizing the capacity and performance of the power supply.

In addition, the connection paths between the first preceding-stage power supply 20 and the second preceding-stage power supply 21 and the corresponding first post-stage power supply 30 and second post-stage power supply 31 in the system of providing power to a chip on a mainboard according to the embodiment of the present disclosure shown in FIG. 20 become short, so that the impedances $Z_{BUS\_1}$ and $Z_{BUS\_2}$ of the corresponding intermediate bus lines become small.

As an embodiment, the intermediate low-voltage bus line between the first preceding-stage power supply 20 and the first post-stage power supply 30 and the intermediate low-voltage bus line between the second preceding-stage power supply 21 and the second post-stage power supply 31 may be cancelled, so as to save the system resources.

As an embodiment, if the distance between the preceding-stage power supply and the post-stage power supply is sufficiently close, the preceding-stage power supply and the post-stage power supply can share a heat sink, so as to reduce the cost of the power supply system.

Cancelling the connection between the intermediate low-voltage bus line between the first preceding-stage power supply 20 and the first post-stage power supply 30 and the intermediate low-voltage bus line between the second preceding-stage power supply 21 and the second post-stage power supply 31 can simplify the design of the system of providing power to a chip on a mainboard. On the one hand, through controlling the current distribution of load among the post-stage power supplies, the current distribution of load between the first post-stage power supply 30 and the second post-stage power supply 31 is realized, at this time, the current distribution of load between the first preceding-stage power supply 20 and the second preceding-stage power supply 21 can be realized spontaneously, so, no current sharing control is needed between the first preceding-stage power supply 20 and the second preceding-stage power supply 21, which can reduce design complexity of the preceding-stage power supply. On the other hand, through controlling the current distribution of load among the preceding-stage power supplies, the current distribution of load between the first preceding-stage power supply 20 and the second preceding-stage power supply 21 is realized, at this time, the current distribution of load between the first post-stage power supply 30 and the second post-stage power supply 31 can be realized spontaneously, so, no control of the current distribution of load is needed between the first post-stage power supply 30 and the second post-stage power supply 31, which can reduce design complexity of the post-stage power supply. As mentioned above, the current distribution of load can be balanced or unbalanced.

In order to realize load current distribution of the preceding-stage power supplies and the post-stage power supplies on the two sides of the chip 1 or to monitor the amount of load on the two sides of the chip 1, current sampling can be respectively performed on the power supply structures on the two sides of the chip 1. In this embodiment, current sampling can be respectively performed on the intermediate low-voltage bus line between the first preceding-stage power supply 20 and the first post-stage power supply 30 and the intermediate low-voltage bus line between the second preceding-stage power supply 21 and the second post-stage power supply 31, without sampling the output currents of the first post-stage power supply 30 and the second post stage power supply 31. Since the output currents of the first post-stage power supply 30 and the second post-stage power supply 31 are higher than the currents on the corresponding intermediate low-voltage bus lines, current sampling on the intermediate low-voltage bus lines can reduce the loss and difficulty of sampling.

The power supply structures on the two sides of the chip 1 may be asymmetric, the first post-stage power supply 30 and the second post-stage power supply 31 on the two sides of the chip 1 may have different output impedances, operating frequencies, power levels, and the like, and the first preceding-stage power supply 20 and the second preceding-stage power supply 21 on the two sides of the chip 1 may have different output impedances, operating frequencies, power levels, and the like. The voltages on the intermediate low-voltage bus lines on the two sides of the chip 1 can be different. The system of providing power to a chip on a mainboard according to the embodiment of the present disclosure shown in FIG. 20 can adopt various control manners adopted by the system of providing power to a chip on a mainboard according to the embodiments of the present disclosure shown in FIGS. 7-18.

Figure 22:
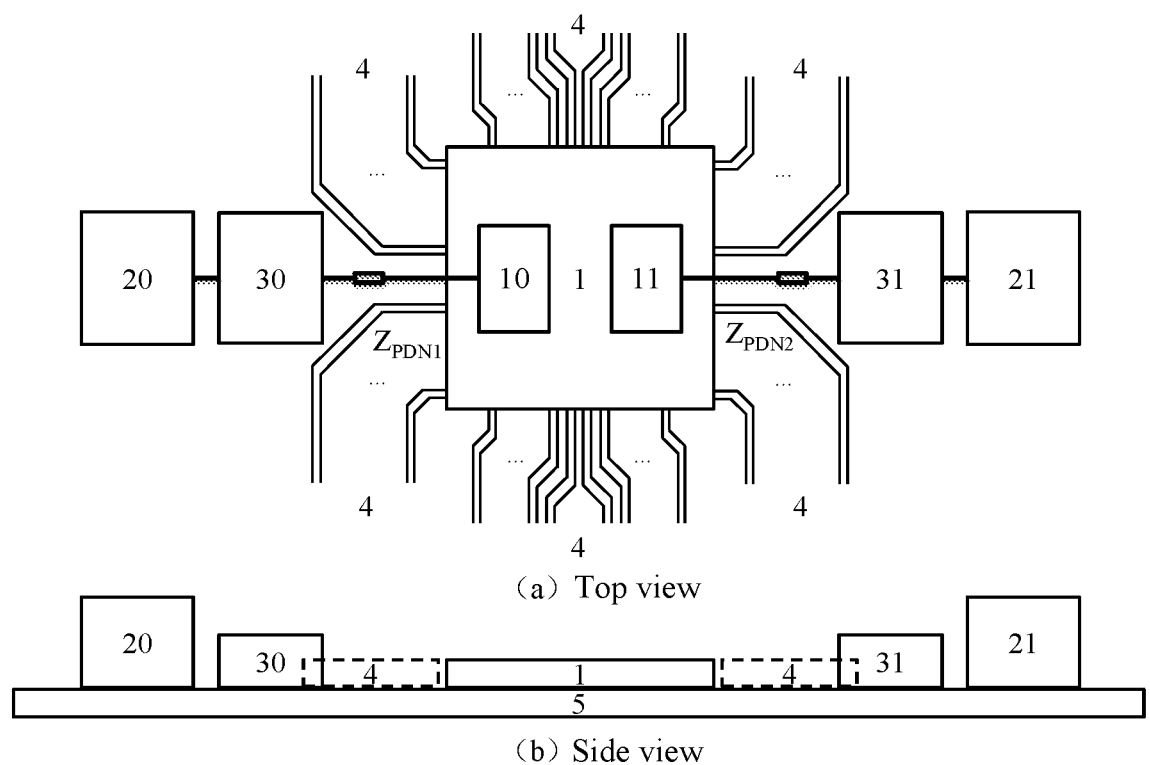
FIG. 22 is a schematic diagram of the spatial arrangement of a system of providing power to a chip on a mainboard according to still another embodiment of the present disclosure.

FIG. 22 is a schematic diagram of the spatial arrangement of a system of providing power to a chip on a mainboard according to still another embodiment of the present disclosure. As shown in the top view (a) and the side view (b) of FIG. 22, in the power supply system of the present embodiment, the chip 1 is a multicore chip, such as a multicore processor, including at least a first core 10 and a second core 11. The first post-stage power supply 30 provides a fourth DC voltage to the first core 10, and the second post-stage power supply 31 provides a fifth DC voltage to the second core 11. Other parts are the same as those in FIG. 20, and the repeated description thereof will be omitted.

The preceding-stage power supplies and the post-stage power supplies are split into corresponding separate power supply structures to respectively provide power for respective corresponding core groups of the multicore processor, which is more convenient to provide optimal voltages for the respective corresponding core groups according to the work tasks being processed by the different respective corresponding core groups, so that the ration of performance to power of the chip 1 can be optimized.

Figure 23:
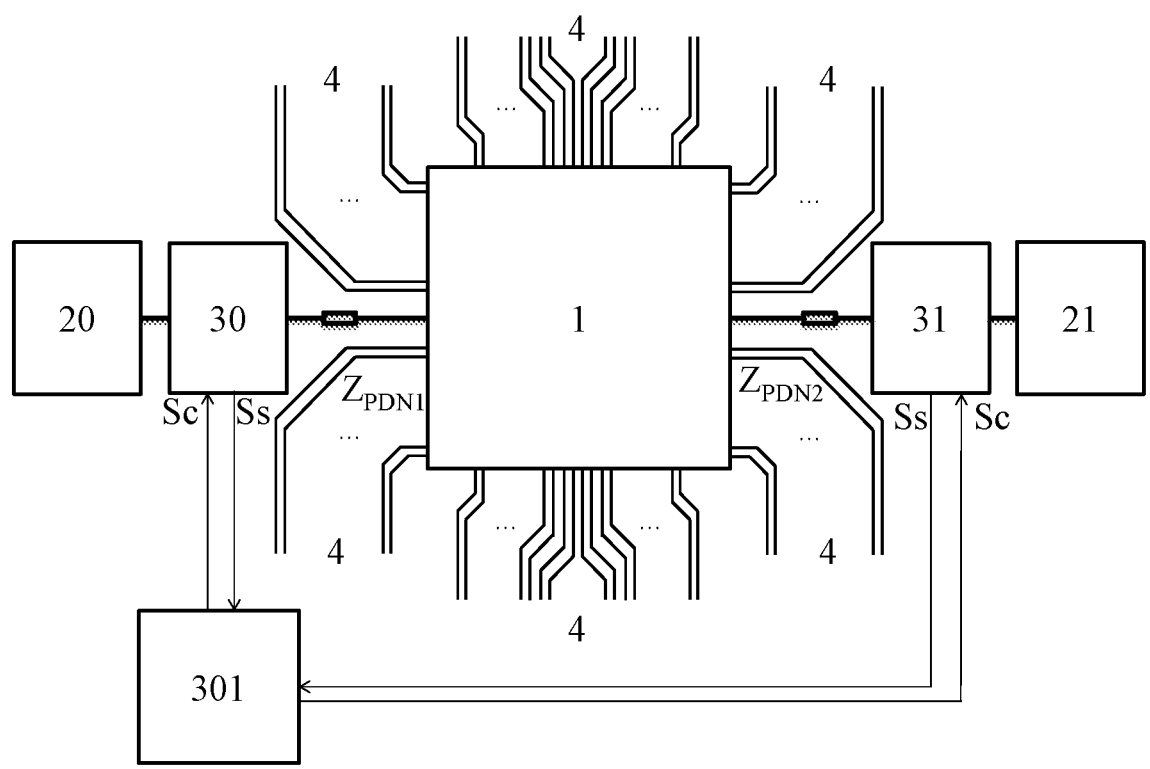
FIG. 23 is a schematic diagram of the spatial arrangement of a system of providing power to a chip on a mainboard according to still another embodiment of the present disclosure.

FIG. 23 is a schematic diagram of the spatial arrangement of a system of providing power to a chip on a mainboard according to still another embodiment of the present disclosure. As shown in FIG. 23, the power supply system of the present embodiment may include: a post-stage power supply controller 301, located on the mainboard 5, configured to control the operation of the first post-stage power supply 30 and the second post-stage power supply 31. The difference between FIG. 23 and FIG. 9 is that the preceding-stage power supply is divided into separate power supply structures, and the repeated description thereof will be omitted.

Figure 24:
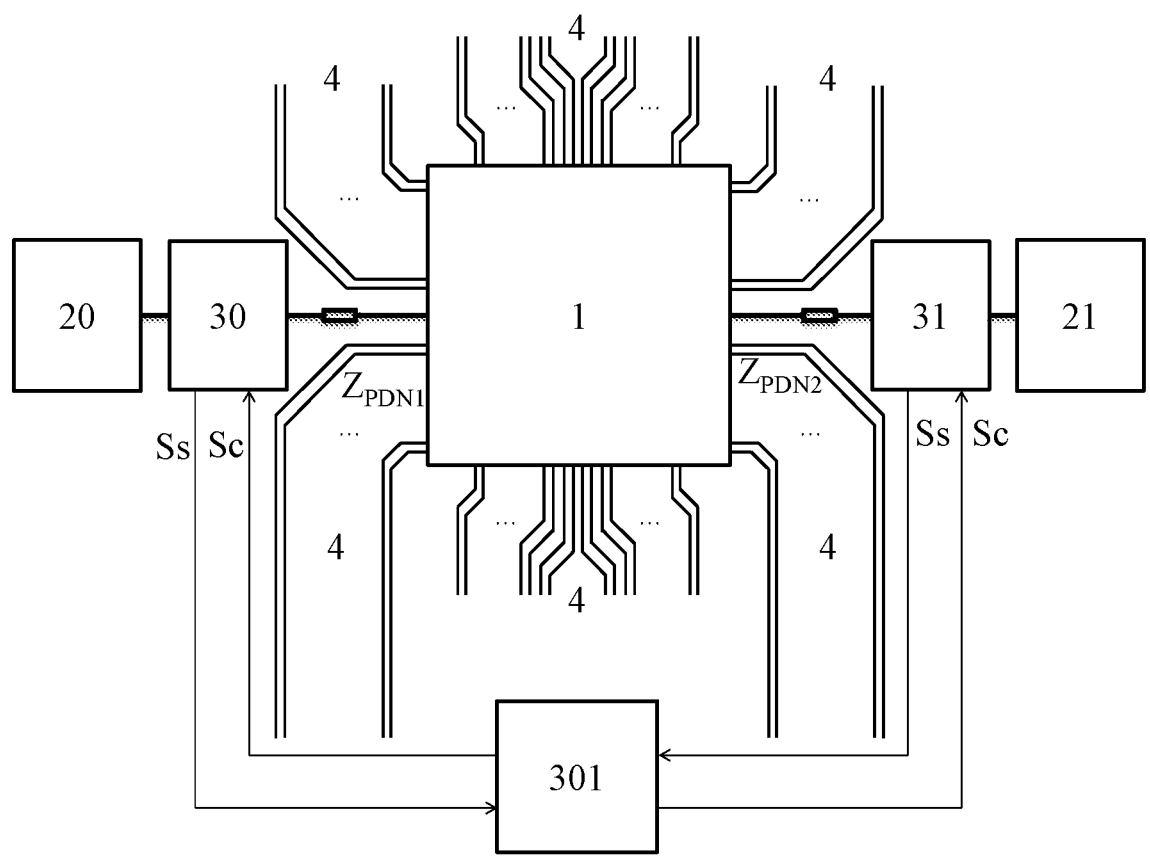
FIG. 24 is a schematic diagram of the spatial arrangement of a system of providing power to a chip on a mainboard according to still another embodiment of the present disclosure.

FIG. 24 is a schematic diagram of the spatial arrangement of a system of providing power to a chip on a mainboard according to still another embodiment of the present disclosure. The difference between FIG. 24 and FIG. 10 is that the preceding-stage power supply is divided into separate power supply structures, and the repeated description thereof will be omitted.

Figure 25:
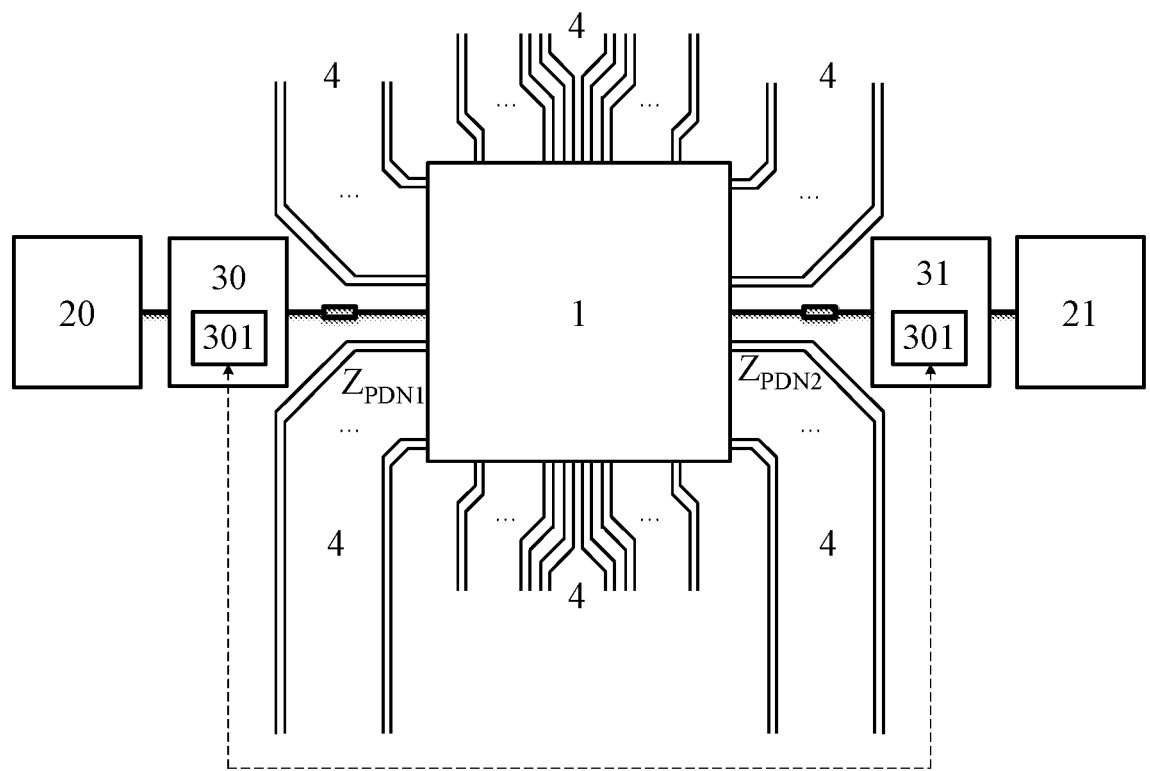
FIG. 25 is a schematic diagram of the spatial arrangement of a system of providing power to a chip on a mainboard according to still another embodiment of the present disclosure.

FIG. 25 is a schematic diagram of the spatial arrangement of a system of providing power to a chip on a mainboard according to still another embodiment of the present disclosure. As shown in FIG. 25, in the power supply system of the present embodiment, each of the first post-stage power supply 30 and the second post-stage power supply 31 may include: a post-stage power supply controller 301, wherein the post-stage power supply controllers 301 of the first post-stage power supply 30 and the post-stage power supply controllers 301 of the second post-stage power supply 31 have signal connections, so as to cooperate with each other, to control the operation of the first post-stage power supply 30 or the second post-stage power supply 31. The difference between FIG. 25 and FIG. 11 is that the preceding-stage power supply is divided into separate power supply structures, and the repeated description thereof will be omitted.

Figure 26:
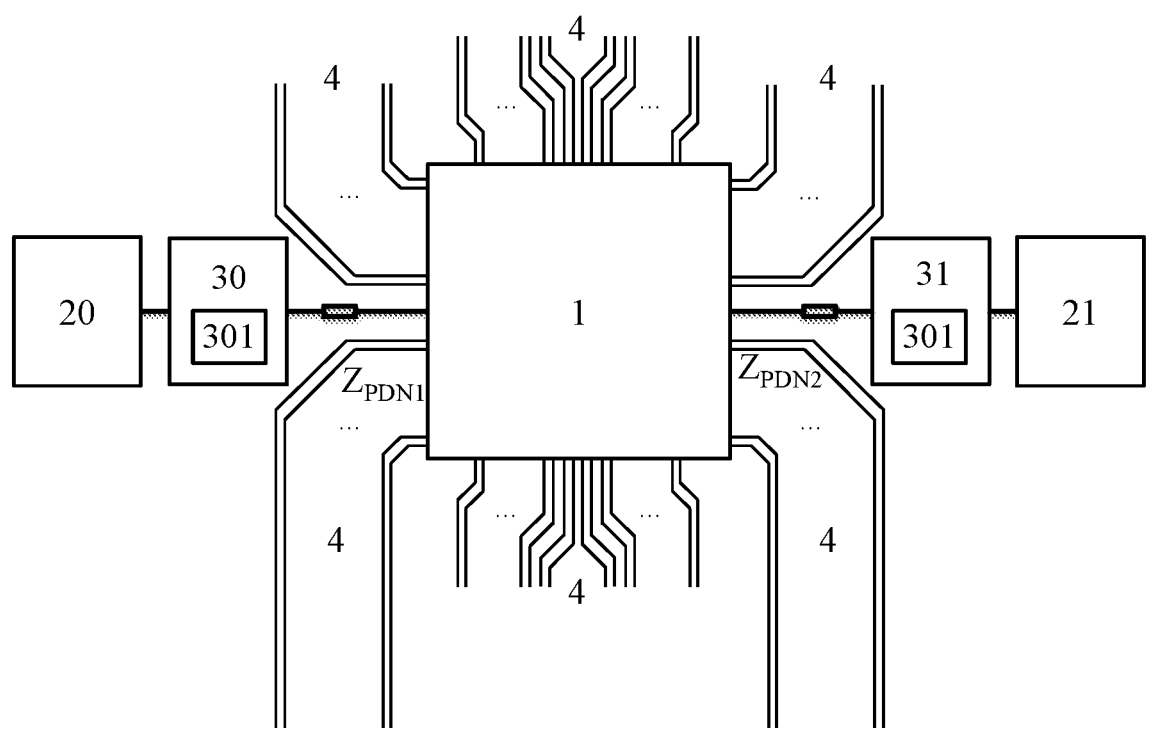
FIG. 26 is a schematic diagram of the spatial arrangement of a system of providing power to a chip on a mainboard according to still another embodiment of the present disclosure.
Figure 27:
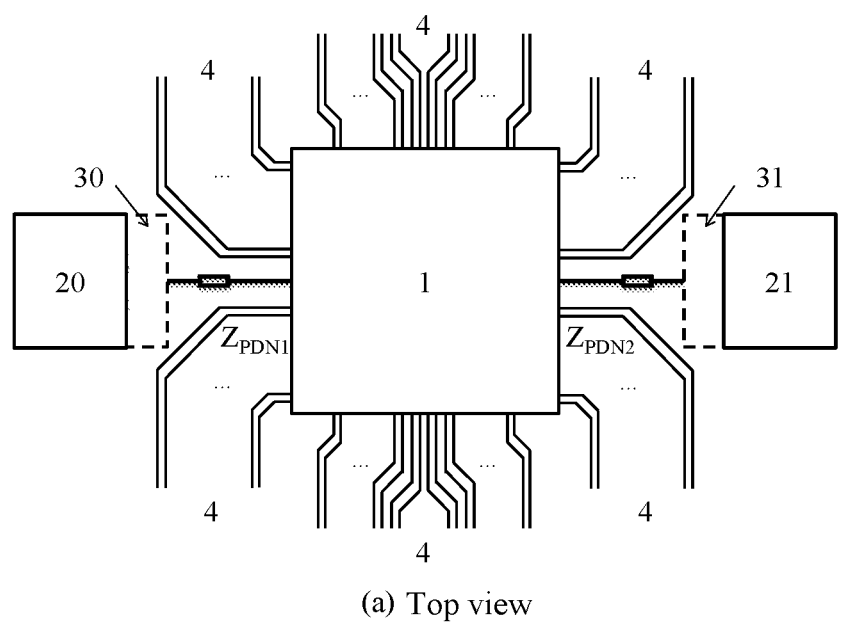
FIG. 27 is a schematic diagram of the spatial arrangement of a system of providing power to a chip on a mainboard according to still another embodiment of the present disclosure.
Figure 27:
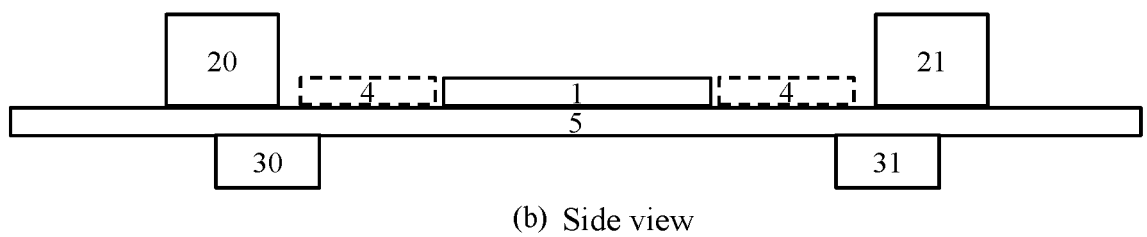

FIG. 26 is a schematic diagram of the spatial arrangement of a system of providing power to a chip on a mainboard according to still another embodiment of the present disclosure. As shown in FIG. 26, in the power supply system of the present embodiment, each of the first post-stage power supply 30 and the second post-stage power supply 31 may include: a post-stage power supply controller 301, configured to separately control the operation of the first post-stage power supply 30 or the second post-stage power supply 31. The difference between FIG. 26 and FIG. 12 is that the preceding-stage power supply is divided into separate power supply structures. The power supply structure and the arrangement manner of the post-stage power supply controller 301 shown in FIG. 26 are convenient to provide optimal voltages for the respective corresponding core groups according to the work tasks being processed by the different respective corresponding core groups in the case of powering the multicore processor chip, so that the ration of performance to power of the chip 1 can be optimized FIG. 27 is a schematic diagram of the spatial arrangement of a system of providing power to a chip on a mainboard according to still another embodiment of the present disclosure. As shown in the top view (a) and the side view (b) of FIG. 27, the first preceding-stage power supply 20 is located on a first side of the mainboard 5, such as the upper surface, the first post-stage power supply 30 is located on a second side of the mainboard 5, for example, the lower surface, the projections of the first preceding-stage power supply 20 and the first post-stage power supply 30 on the mainboard 5 are at least partially overlapped; and the second preceding-stage power supply 21 is located on the first side of the mainboard 5, the second post-stage power supply 31 is located on the second side of the mainboard 5, the projections of the second preceding-stage power supply 21 and the second post-stage power supply 31 on the mainboard 5 are at least partially overlapped.

Similar to the cases of FIGS. 15-17, in order to further reduce the impedance between the preceding-stage power supplies and the post-stage power supplies, the preceding-stage power supplies and the post-stage power supplies can be located on different surfaces of the mainboard of the system, so that the projections of both on the mainboard are closer, partially overlapped or even completely overlapped. When the preceding-stage power supply and/or the post-stage power supply at one side of the chip 1 are composed of a plurality of power supply modules, these power supply modules can be located on different surfaces of the mainboard of the system.

The first preceding-stage power supply 20, the second preceding-stage power supply 21, the first post-stage power supply 30 and the second post-stage power supply 31 on the two sides of the chip 1 may have different output impedances, operating frequencies and power levels. The system of providing power to a chip on a mainboard according to the embodiments of the present disclosure shown in FIGS. 20 and 22-27 can adopt various control manners adopted by the system of providing power to a chip on a mainboard according to the embodiments of the present disclosure shown in FIGS. 7-18.

For example, as an embodiment, in the system of providing power to a chip on a mainboard according to the embodiments of the present disclosure shown in FIGS. 20 and 22-27, the fourth DC voltage and the fifth DC voltage are not equal.

For example, as an embodiment, in the system of providing power to a chip on a mainboard according to the embodiments of the present disclosure shown in FIGS. 20 and 22-27, the first side and the second side are adjacent or opposite sides of the chip 1.

For example, as an embodiment, in the system of providing power to a chip on a mainboard according to the embodiments of the present disclosure shown in FIGS. 20 and 22-27, the dynamic response speed of the first post-stage power supply 30 is greater than the dynamic response speed of the first preceding-stage power supply 20, and the dynamic response speed of the second post-stage power supply 31 is greater than the dynamic response speed of the second preceding-stage power supply 21.

For example, as an embodiment, in the system of providing power to a chip on a mainboard according to the embodiments of the present disclosure shown in FIGS. 20 and 23-27, the dynamic response speed of the first post-stage power supply 30 is greater than the dynamic response speed of the second post-stage power supply 31, and the output power of the first post-stage power supply 30 in response to the load dynamic change of the chip 1 is greater than the output power of the second post-stage power supply 31 in response to the same load dynamic change of the chip 1.

For example, as an embodiment, in the system of providing power to a chip on a mainboard according to the embodiments of the present disclosure shown in FIGS. 20 and 23-27, the output impedance of the first post-stage power supply 30 is smaller than the output impedance of the first preceding-stage power supply 20, and the output impedance of the second post-stage power supply 31 is smaller than the output impedance of the second preceding-stage power supply 21.

For example, as an embodiment, in the system of providing power to a chip on a mainboard according to the embodiments of the present disclosure shown in FIGS. 20 and 23-27, the output impedance of the first post-stage power supply 30 is smaller than the output impedance of the second post-stage power supply 31, and the dynamic current provided by the first post-stage power supply 30 is greater than the dynamic current provided by the second post-stage power supply 31.

For example, as an embodiment, in the system of providing power to a chip on a mainboard according to the embodiments of the present disclosure shown in FIGS. 20 and 22-27, all of the first preceding-stage power supply 20, the second preceding-stage power supply 21, the first post-stage power supply 30 and the second post-stage power supply 31 are switching power supplies, the operating frequency of the first post-stage power supply 30 is higher than the operating frequency of the first preceding-stage power supply 20, and the operating frequency of the second post-stage power supply 31 is higher than the operating frequency of the second preceding-stage power supply 21.

For example, as an embodiment, in the system of providing power to a chip on a mainboard according to the embodiments of the present disclosure shown in FIGS. 20 and 23-27, the operating frequency of the first post-stage power supply 30 is higher than that of the second post-stage power supply 31, the first post-stage power supply 30 provides a high frequency component of the dynamic current of the chip 1, and the second post-stage power supply 31 provides a low frequency component of the dynamic current of the chip 1.

For example, as an embodiment, in the system of providing power to a chip on a mainboard according to the embodiments of the present disclosure shown in FIGS. 20 and 23-27, both the first post-stage power supply 30 and the second post-stage power supply 31 are switching power supplies, the operating frequency of the first post-stage power supply 30 is N times the operating frequency of the second post-stage power supply 31, where N is an integer greater than 1, the output currents of the first post-stage power supply 30 and the second post-stage power supply 31 have ripples of different phases, and the outputs of the first post-stage power supply 30 and the second post-stage power supply 31 are connected in parallel, such that the ripple after superposition is reduced.

Compared with the system of providing power to a chip on a mainboard according to the embodiments of the present disclosure shown in FIGS. 7, 9-12, 14, 17 and 18, the system of providing power to a chip on a mainboard according to the embodiments of the present disclosure shown in FIGS. 20 and 22-27 can minimize the impedance between the preceding-stage power supply and the post-stage power supply, and realize the balance of power supply impedance on the two sides of the processor chip, thereby better exerting the performance of the post-stage power supply with high frequency.

Figure 28:
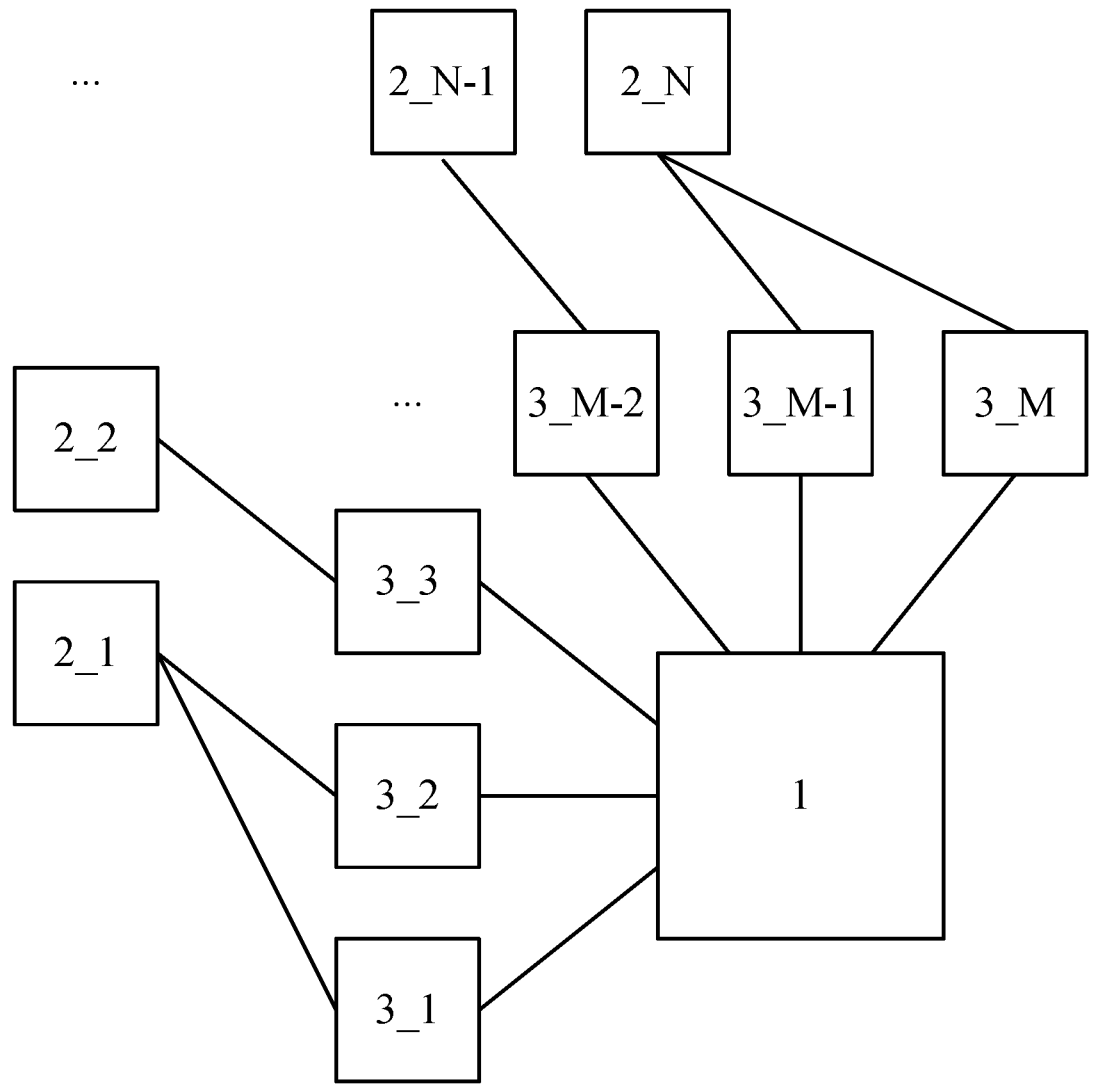
FIG. 28 is a topological view of a schematic diagram of the spatial arrangement of a system of providing power to a chip on a mainboard according to still another embodiment of the present disclosure.

FIG. 28 is a topological view of a schematic diagram of the spatial arrangement of a system of providing power to a chip on a mainboard according to still another embodiment of the present disclosure. As shown in FIG. 28, the system of providing power to a chip on a mainboard according to the embodiment of the present disclosure includes: N preceding-stage power supplies 2_1, 2_2 ... 2_N-1 and 2_N and M post-stage power supplies 3_1, 3_2, 3_3 ... 3_M-2, 3_M-1 and 3_M, for supplying power to a chip 1 disposed on a mainboard, wherein N is a positive integer, M is an integer not less than N and not less than 3, the chip 1 is, for example, a processor chip, and the processor chip may be a multicore processor.

All of the N preceding-stage power supplies are located on the mainboard, all of which are DC-DC converters, configured to receive a first DC voltage, and provide second DC voltages, and the first DC voltage is greater than the second DC voltages.

All of the M post-stage power supplies are located on the mainboard, all of which are DC-DC converters, wherein the M post-stage power supplies are electrically connected to the corresponding N preceding-stage power supplies respectively, to receive the second DC voltages. A first group (for example, 3_1, 3_2 and 3_3) of the M post-stage power supplies is disposed at a first side of the chip 1, a second group (for example, 3_M-2, 3_M-1) and 3_M) of the M post-stage power supplies is disposed at a second side of the chip 1, and all of the distances between the M post-stage power supplies on the mainboard and the chip 1 are less than or equal to the distances between the N preceding-stage power supplies on the mainboard and the chip 1. The M post-stage power supplies respectively provide a third DC voltage to an $(M+2)^{th}$ DC voltage to the chip 1, and each of the second DC voltages is greater than the third DC voltage to the $(M+2)^{th}$ DC voltage. One preceding-stage power supply can be connected to one or more post-stage power supplies.

As an embodiment, in the system of providing power to a chip on a mainboard according to the embodiment of the present disclosure shown in FIG. 28, the first side and the second side are adjacent or opposite sides of the chip 1.

The power supply structures on the two sides of the chip 1 may be asymmetric, the post-stage power supplies on the two sides of the chip 1 may have different output impedances, operating frequencies, power levels, and the like, and the preceding-stage power supplies on the two sides of the chip 1 may have different output impedances, operating frequencies, power levels, and the like. The voltages on the intermediate low-voltage bus lines between the preceding-stage power supplies and the corresponding post-stage power supplies on the two sides of the chip 1 can be different. The system of providing power to a chip on a mainboard according to the embodiment of the present disclosure shown in FIG. 28 can adopt various control manners adopted by the system of providing power to a chip on a mainboard according to the embodiments of the present disclosure shown in FIGS. 22-27.

The system of providing power to a chip on a mainboard according to the embodiments of the present disclosure shown in FIGS. 7-28 can reduce the impedances between the preceding-stage power supplies and the post-stage power supplies, and realize the balance of power supply impedance on the two sides of the processor chip, thereby improving response and frequency characteristics of the power supply, and increasing efficiency of the power supply.

The present disclosure has been described through the above related embodiments, but the above embodiments are merely examples for implementing the present disclosure. It must be noted that the disclosed embodiments do not limit the scope of the disclosure. Conversely, modifications and refinements made without departing from the spirit and scope of the disclosure are within the scope of the disclosure.

What is claimed is:

1. A system of providing power to a chip on a mainboard, comprising:
a first power supply, located on the mainboard, wherein the first power supply is configured to receive a first voltage and to provide a second voltage; and
a second power supply and a third power supply, wherein the second power supply and the third power supply are located on the mainboard and disposed at different sides of the chip, each of the second power supply and the third power supply is electrically connected to the first power supply to receive the second voltage, the second power supply provides a third voltage to the chip, the third power supply provides a fourth voltage to the chip, and $$Z_{BUS\_2} \leq 5*(Z_{PS2\_2}+Z_{PDN\_2}),$$

wherein $Z_{BUS\_2}$ is bus impedance between the first power supply and the third power supply, $Z_{PS2\_2}$ is equivalent output impedance of the third power supply, and $Z_{PDN\_2}$ is transmission impedance between the third power supply and the chip.

2. The system according to claim 1, wherein the first power supply, the second power supply and the third power supply are DC-DC converters, and the first voltage is greater than the third voltage or the fourth voltage.

3. The system according to claim 1, wherein
the first voltage is greater than the second voltage; and
the second voltage is greater than the third voltage and the fourth voltage.

4. The system according to claim 1, wherein
equivalent output impedance of each of the second power supply and the third power supply is smaller than equivalent output impedance of the first power supply.

5. The system according to claim 1, wherein
a distance on the mainboard between each of the second power supply and the third power supply and the chip is less than or equal to a distance on the mainboard between the first power supply and the chip; and
a distance between the first power supply and the second power supply is less than a distance between the first power supply and the third power supply.

6. The system according to claim 1, wherein
the first power supply and the second power supply are located at a first side of the chip, the third power supply is located at a second side of the chip, and the first side and the second side are adjacent or opposite sides of the chip.

7. The system according to claim 1, wherein
the first power supply, the second power supply and the third power supply are switching power supplies;
an operating frequency of each of the second power supply and the third power supply is higher than an operating frequency of the first power supply; and
a dynamic response speed of each of the second power supply and the third power supply is greater than a dynamic response speed of the first power supply.

8. The system according to claim 1, wherein
a dynamic response speed of the second power supply is greater than a dynamic response speed of the third power supply; and
output power of the second power supply in response to a load dynamic change of the chip is greater than output power of the third power supply in response to the load dynamic change of the chip.

9. The system according to claim 1, wherein
output impedance of the second power supply is smaller than output impedance of the third power supply; and
a dynamic current provided by the second power supply is greater than a dynamic current provided by the third power supply.

10. The system according to claim 1, wherein
an operating frequency of the second power supply is higher than an operating frequency of the third power supply, the second power supply provides a high frequency component of a dynamic current to the chip, and the third power supply provides a low frequency component of the dynamic current to the chip.

11. The system according to claim 1, wherein
the chip is a multicore chip, comprising a first core and a second core; and
the second power supply provides the third voltage to the first core, and the third power supply provides the fourth voltage to the second core.

12. A system of providing power to a chip on a mainboard, comprising:
a first power supply and a second power supply, wherein the first power supply and the second power supply are located on the mainboard, each of the first power supply and the second power supply is configured to receive a first voltage, the first power supply provides a second voltage, and the second power supply provides a third voltage;
a third power supply and a fourth power supply, wherein the third power supply and the fourth power supply are located on the mainboard, the third power supply is electrically connected to the first power supply to receive the second voltage, the fourth power supply is electrically connected to the second power supply to receive the third voltage, the third power supply and the first power supply are disposed at a first side of the chip, the fourth power supply and the second power supply are disposed at a second side of the chip, the first side of the chip and the second side of the chip are adjacent or opposite sides of the chip, the third power supply provides a fourth voltage to the chip, the fourth power supply provides a fifth voltage to the chip; and
at least one power supply controller, located on the mainboard, and configured to control operation of the third power supply and the fourth power supply.

13. The system according to claim 12, wherein the first power supply, the second power supply, the third power supply and the fourth power supply are DC-DC converters, and the first voltage is greater than the fourth voltage or the fifth voltage.

14. The system according to claim 12, wherein
output of the first power supply and output of the second power supply are not connected in parallel.

15. The system according to claim 14, wherein
the power supply controller performs distribution of a load current of the third power supply and a load current of the fourth power supply to realize distribution of a load current of the first power supply and a load current of the second power supply, and the load current is in at least one state of a steady state or a dynamic state.

16. The system according to claim 12, wherein
the power supply controller is placed at a position equidistant from the third power supply and the fourth power supply.

17. The system according to claim 12, wherein
each of the third power supply and the fourth power supply corresponds to a power supply controller of the at least one power supply controller, and power supply controllers of the third power supply and the fourth power supply communicate with each other, so as to control the operation of the third power supply and the fourth power supply respectively.

18. The system according to claim 12, wherein
each of the third power supply and the fourth power supply corresponds to a power supply controller of the at least one power supply controller, the power supply controller of the third power supply is configured to independently control the operation of the third power supply, the power supply controller of the fourth power supply is configured to independently control the operation of the fourth power supply, and power supply controllers of the third power supply and the fourth power supply do not communicate with each other.

19. The system according to claim 12, wherein
input of the third power supply and input of the fourth power supply are connected in parallel, and $Z_{BUS\_2} \leq 5*(Z_{PS2\_2}+Z_{PDN\_2})$,
wherein $Z_{BUS\_2}$ is bus impedance between the first power supply and the fourth power supply, $Z_{PS2\_2}$ is equivalent output impedance of the fourth power supply, and $Z_{PDN\_2}$ is transmission impedance between the fourth power supply and the chip.

20. The system according to claim 12, wherein
the first voltage is greater than the second voltage and the third voltage, the second voltage is greater than the fourth voltage and the third voltage is greater than the fifth voltage, and the second voltage is different from the third voltage.

21. The system according to claim 12, wherein
a distance on the mainboard between each of the third power supply and the fourth power supply and the chip is less than or equal to a distance on the mainboard between each of the first power supply and the second power supply and the chip;
equivalent output impedance of the third power supply is smaller than equivalent output impedance of the first power supply; and
equivalent output impedance of the fourth power supply is smaller than equivalent output impedance of the second power supply.

22. The system according to claim 12, wherein
the chip is a multicore chip, comprising at least a first core and a second core; and the third power supply provides the fourth voltage to the first core, and the fourth power supply provides the fifth voltage to the second core.

23. The system according to claim 12, wherein
a dynamic response speed of the third power supply is greater than a dynamic response speed of the first power supply; and
a dynamic response speed of the fourth power supply is greater than a dynamic response speed of the second power supply.

24. The system according to claim 12, wherein
a dynamic response speed of the third power supply is greater than a dynamic response speed of the fourth power supply; and
output power of the third power supply in response to a load dynamic change of the chip is greater than output power of the fourth power supply in response to the load dynamic change of the chip.

25. The system according to claim 12, wherein
output impedance of the third power supply is smaller than output impedance of the fourth power supply; and
a dynamic current provided by the third power supply is greater than a dynamic current provided by the fourth power supply.

26. The system according to claim 12, wherein
an operating frequency of the third power supply is higher than an operating frequency of the fourth power supply, the third power supply provides a high frequency component of a dynamic current to the chip, and the fourth power supply provides a low frequency component of the dynamic current to the chip.

27. The system according to claim 12, wherein
the first power supply and the second power supply are located on a first surface of the mainboard, the third power supply and the fourth power supply are located on a second surface of the mainboard, a projection of the third power supply and a projection of the first power supply on the mainboard are at least partially overlapped, and a projection of the fourth power supply and a projection of the second power supply on the mainboard are at least partially overlapped.

* * * * *